US009355100B2

(12) United States Patent
Rauber

(10) Patent No.: US 9,355,100 B2
(45) Date of Patent: May 31, 2016

(54) METHODS AND APPARATUS FOR RECONCILING VERSIONS OF MEDIA CONTEXT LISTS IN COMMUNICATIONS NETWORKS

(75) Inventor: Peter Rauber, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 12/235,550

(22) Filed: Sep. 22, 2008

(65) Prior Publication Data

US 2010/0082561 A1 Apr. 1, 2010

(51) Int. Cl.
G06F 17/30 (2006.01)
H04N 21/222 (2011.01)
H04N 21/231 (2011.01)
H04N 21/258 (2011.01)

(52) U.S. Cl.
CPC .... *G06F 17/30029* (2013.01); *G06F 17/30053* (2013.01); *H04N 21/2223* (2013.01); *H04N 21/23109* (2013.01); *H04N 21/258* (2013.01)

(58) Field of Classification Search
None
See application file for complete search history.

(56) References Cited

U.S. PATENT DOCUMENTS

| 5,600,834 A | 2/1997 | Howard |
| 7,319,536 B1 * | 1/2008 | Wilkins et al. ............... 358/1.15 |
| 7,403,769 B2 | 7/2008 | Kopra et al. |
| 7,603,385 B2 | 10/2009 | Panabaker et al. |
| 2003/0167318 A1 | 9/2003 | Robbin et al. |
| 2004/0139180 A1 | 7/2004 | White et al. |
| 2006/0036549 A1 | 2/2006 | Wu |
| 2006/0041577 A1 | 2/2006 | Ellicott et al. |
| 2006/0168351 A1 | 7/2006 | Ng et al. |
| 2008/0151291 A1 | 6/2008 | Ohno et al. |
| 2008/0168183 A1 | 7/2008 | Marcy et al. |
| 2009/0006498 A1 | 1/2009 | Freedman |
| 2009/0282050 A1 * | 11/2009 | Thomas et al. ................. 707/10 |
| 2010/0223232 A1 | 9/2010 | Wakefield |
| 2010/0223239 A1 | 9/2010 | Madsen et al. |

FOREIGN PATENT DOCUMENTS

| CN | 1677355 A | 10/2005 | |
| CN | 1914601 A | 2/2007 | |
| EP | 1942425 | 7/2008 | |
| EP | 1942425 A1 * | 7/2008 | ............. G06F 17/30 |
| JP | 2007200522 A | 8/2007 | |

(Continued)

OTHER PUBLICATIONS

HTC Smart Mobility: "Pocket PC Phone User Manual" Internet Citation Jan. 1, 2006, XP002476354 Retrieved from the Internet: URL:http://ac11pda.com/Dosyalar/HTC P4350 English_UM.pdf> [retrieved on Apr. 14, 2008] the whole document.

(Continued)

*Primary Examiner* — Son T Hoang
(74) *Attorney, Agent, or Firm* — Charles E. Eggers

(57) ABSTRACT

Methods, systems, devices, apparatus and computer-program products are defined for reconciling different versions of media content lists that concurrently exist in a communication network. The merged media content lists are based on foreseen user expectations, taking into account typical user behavior. The merged media content lists includes the merge of media content acquisition priority lists that are maintained and routinely updated by the associated media content user.

33 Claims, 13 Drawing Sheets

(56) References Cited

FOREIGN PATENT DOCUMENTS

| | | |
|---|---|---|
| JP | 2007526678 A | 9/2007 |
| TW | 406242 B | 9/2000 |
| TW | 200512612 | 4/2005 |
| WO | WO2004086405 A1 | 10/2004 |
| WO | WO2005073856 A2 | 8/2005 |
| WO | WO2005109882 | 11/2005 |

OTHER PUBLICATIONS

International Search Report & Written Opinion—PCT/US2009/057735, International Search Authority—European Patent Office—Mar. 29, 2010.

Taiwan Search Report—TW098131943—TIPO—Jan. 31, 2013.

* cited by examiner

Media Content Player Device Media Content List 400

- 452 → 1. Media Content "A"  2PM
- 454 → 2. Media Content "B"  2PM
- 456 → 3. Media Content "D"  4PM
- 458 → 4. Media Content "C"  4PM
- 460 → 5. Media Content "E"  2PM

FIG. 18

Network Apparatus Media Content List 500

- 552 → 1. Media Content "B"  3PM
- 554 → 2. Media Content "C"  3PM
- 556 → 3. Media Content "A"  3PM
- 558 → 4. Media Content "D"  3PM
- 560 → 5. Media Content "E"  3PM

FIG. 19

Unified Media Content List 600

- 652 → 1. Media Content "B"  3PM
- 654 → 2. Media Content "D"  4PM
- 656 → 3. Media Content "C"  4PM
- 658 → 4. Media Content "A"  3PM
- 660 → 5. Media Content "E"  3PM

FIG. 20

METHODS AND APPARATUS FOR RECONCILING VERSIONS OF MEDIA CONTEXT LISTS IN COMMUNICATIONS NETWORKS

BACKGROUND

1. Field

The disclosed aspects relate to communications networks, and more particularly, to systems, methods and apparatus for reconciling different version of concurrently existing media content lists in communication networks.

2. Background

Communication devices, and more specifically wireless communication devices, such as cellular telephones, have rapidly gained in popularity over the past decade. These devices are rapidly becoming multifaceted devices capable of providing a wide-range of functions. For example, a cellular telephone may also embody computing capabilities, Internet access, electronic mail, text messaging, GPS mapping, digital photographic capability, an audio/MP3 player, video gaming capabilities and the like.

In addition, wireless communication devices are increasingly being manufactured with the ability to receive media content, such as audio content, video content, multimedia content, gaming content, data/text content or the like. As such, the communication devices may be configured to receive one-to-many transmissions, such as broadcast transmissions and/or multicast transmissions and/or one-to-one transmissions, such as unicast transmissions or the like.

As the use of media content or portable and/or wireless devices increases, users desire continuous access to media content across a wide array of devices, both fixed and mobile. The ability to rapidly download media content in a "pay per view" subscription from a set top box or to download or stream media content over a broadband connection raise expectations for instant access. In this regard, a reduced time is desired between making a selection and having the selection available for viewing, playing, executing or the like.

With expanded storage, processing and display capabilities, portable devices that play media content (e.g., audio, video, text, haptic material, etc.) are becoming ubiquitous. Portable media players (PMP) can also be just one aspect of a convergent handheld device that has uses such as a personal digital assistant (PDA), cellular telephone, email application, etc. For some users who travel frequently, a mobile communication device that serves at least in part as a PMP can become a predominant source of entertainment and information.

In many instances users who play or otherwise use media content may have a preference for the next media content that they wish to play, view or otherwise use. For example, a user may have a preference to view a specific motion picture or listen to a certain audio CD (compact disc). Preferences for playing or otherwise using media content may result in a user having a media content priority list, which defines a priority listing of the media content that a user desires to acquire or otherwise use.

This type of media content priority list is used in conjunction with current online Digital Video Disc (DVD) rental services, such as Netflix or the like. In the Netflix scenario, a user creates a priority listing of the DVDs that he or she wishes to rent, the service delivers, typically through conventional mail service, a predetermined number of DVDs to a subscriber and once the user has returned the DVD or DVDs to the service, typically back through the mail service, an additional DVD or DVDs are sent to the subscriber. The additional DVD or DVDs are identified based on the subscribers DVD priority list. At any point in time a subscriber may edit the priority list by deleting a DVD that they no longer desire to rent, adding a new DVD they desire to rent or changing the priority order of the DVDs they desire to rent. The priority list for the subscriber is available online and, thus, is stored by the service provider at a network server site.

In the instance in which media content is being wirelessly delivered to a PMP, the use of such media content priority listings as a means of defining the order in which media content is delivered to the PMP, may pose additional problems. In particular different lists may concurrently exist for a single media content user. This is because the media content list may be required or otherwise configured to be stored at the PMP and simultaneously at the network side. In such cases, a user may modify the list stored on the PMP at a point in time when the PMP does not have a connection to the network. In such instances, the modifications may not be sent to the network until a network connection is made, which may conceivably be hours or even days in terms of time. In the interim, before the PMP has had the opportunity to re-connect with the network and send the modifications to the network, the media content user may access another device, such as a PC or the like, with a network connection and provide altogether different modifications from the modifications that were made on the PMP but have yet to sent to the network. Once the network connection has been re-established by the PMP and the modifications to the priority list sent to the network, the network has no means for determining which of the modifications take precedent and, thus, which modifications should be reflected in the user's current media content priority list.

It is also possible for similar type modification conflicts to arise if the subscription for media content delivery configured for multiple users or more than one user has access to the subscription. In which case, multiple users may modify the media content list simultaneously on multiple devices (e.g. one user/subscriber modifies the list from the PMP simultaneously with another user/subscriber modifying the list from a PC). Once again, the network has no means for determining which of the simultaneous modifications take precedent and, thus, which modifications should be reflected in the subscriptions current media content priority list.

Therefore a need exists for methods, systems, apparatus and/or computer program products that will eliminate conflicts in having concurrently existing versions of media content lists, such as media content priority lists. The desired methods, systems, apparatus and/or computer program products should address the problem in which one version of the media content list exists at the media content player device level, such as a PMP level, while another version of the media content list exists at the network level, such as at the network server level. Additionally, the desired methods, systems, apparatus and/or computer program products should provide for conflict resolution in the instance in which modifications occur simultaneously on multiple devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatus, systems and computer program products are provided for reconciling different versions of media content lists that concurrently exist in a communication network. Aspects herein disclosed merge media content lists based on foreseen user expectations, taking into account typical user behavior. In order to merge the concurrently existing media content lists present aspects provide for determining that differing media lists exist by providing for a timestamp associated with each entry in the list and/or an overall timestamp for the list, and comparing the list or list content each time devices, such as media content players, network servers and the like connect. If an entry timestamp is determined to differ amongst the lists, then the lists are deemed different a merge occurs. In one aspect a merge occurs and a unified media content list results by adding all media content addition entries to the unified media content, deleting media content entries if the entry has been deleted in both or all media content lists, marking entries as possible deletions if the media content entry has been deleted from less than all of the media content lists and ordering the entries according to their position with the latest timestamp (i.e., conflicting positions are ordered with the latest timestamp first).

A method for reconciling concurrently existing versions of a media content list defines a first aspect. The method includes determining that a plurality of versions of a media content list concurrently exist, merging the plurality of versions of the media content list into a unified version and storing the unified version of the media content list. The media content priority list may further be defined as a media content priority list, and further defined as a media content acquisition priority list or the like.

In one aspect of the method, determining that a plurality of versions of a media content list concurrently exist provides for comparing media content lists stored on two or more devices, each time at least two of the devices establish a network connection. Comparing media content lists may include comparing timestamps associated with the lists or comparing timestamps associated with each entry in the media content lists, wherein a plurality of versions is determined to exist if one or more timestamps differ amongst entries in the media content lists.

In certain aspects of the method determining may further include determining that more than two versions of the media content list concurrently exist. In such aspects, the merging of the more than two versions may occur pairwise, the first pair of versions that are merged being the two versions that are earliest in time followed by the merging of the result of the first pair of versions with the next-in-time version and so on until all concurrently existing versions have been merged into a unified version.

According to aspects of the method, merging may occur in the following manner. All media content addition entries from the plurality of versions may be added to the unified version. If all of the plurality of concurrently existing versions include a deletion for a specific media content entry, the media content entry may be deleted from the unified version. If less than all of the plurality of concurrently existing versions include a deletion for a specific media content entry, the media content entry may identified in the unified version as a possible deletion. In certain aspects, all media content entries that have been identified as possible deletions may be moved to the end of the list after the merge has completed all media content entry additions, deletions and order changes. Additionally, the entries in the unified version of the media content list are ordered based on a latest timestamp in the versions being merged, such that conflicting positions in the order are ordered with the latest timestamp appearing first in the list of the unified version.

In other aspects of the method storing the unified version of the media content list may further include storing the unified version of the media content list at one or more communications devices and at one or more network devices. As such, the method may further include communicating the unified version of the media content list to at least one of a communications device or a network device.

At least one processor configured to reconcile concurrently existing versions of a media content list defines another aspect. The processor includes a first module for determining that a plurality of versions of a media content list concurrently exist, a second module for merging the plurality of versions of the media content list into a unified version and a third module for storing the unified version of the media content list.

Yet another aspect is provided for by a computer program product that includes a computer-readable medium. The medium includes a first set of codes for causing a computer to determine that a plurality of versions of a media content list concurrently exist, a second set of codes for causing the computer to merge the plurality of versions of the media content list into a unified version and a third set of codes for causing the computer to store the unified version of the media content list.

An apparatus for reconciling concurrently existing versions of a media content list defines another aspect. The apparatus includes means for determining that a plurality of versions of a media content list concurrently exist, means for merging the plurality of versions of the media content list into a unified version and means for storing the unified version of the media content list.

A communication device defines yet another related aspect. The device includes a computer platform including a processor and a memory in communication with the processor. The device further includes a media content list module stored in the memory and in communication with the processor. The media content list module is operable to provide for a user configurable media content list. The device also includes a media content list merge module stored in the memory and in communication with the processor, wherein the media content list merge module is operable to determine that a plurality of versions of a media content list concurrently exist, merge the versions of the media content list into a unified version and store the unified version of the media content list.

In certain aspects the communication device may further include a media content player module stored in the memory and in communication with the processor. The media content player module is operable to play selected media content on the device.

In one aspect of the device the media content priority list module is further operable to provide for a user configurable media content priority list, and further a user configurable media content acquisition priority list or any other conceivable user configurable media content list. In further aspects, the media content list module is further operable to create a timestamp each time an entry in the media content list is edited or otherwise modified.

In certain aspects of the device the media content list merge module is further operable to compare the device-based media content list with a network-based media content list each time the device establishes a network connection with a media content service. In this regard, the media content list merge module may be further operable to compare timestamps associated with each entry in existing media content lists, such that a plurality of versions is determined to exist if one or more timestamps differ amongst entries in the existing media content lists.

In alternate aspects of the device the media content list merge module may be further operable to determine that more than two versions of the media content list concurrently exist. In such aspects, the media content list merge module may be further operable to merge of the more than two versions pairwise, such that the first pair of versions that are merged are the two versions that are earliest in time followed by the merging of the result of the first pair of versions with the next-in-time version and so on until all concurrently existing versions have been merged into a unified version.

In one aspect of the device the media content list merge module may be further operable to conduct the merge using one or more of the following merge rules. In one aspect the merge module may add all media content addition entries from the plurality of versions into the unified version of the media content list. In another aspect the merge module may delete a media content entry from the unified version if all of the plurality of versions include a deletion for that specific media content entry. In a further aspect the merge module may identify list entries as possible deletions if less than all of the plurality of versions include a deletion for that specific media content entry. In such aspects in which the merge module has identified list entries as possible deletions the module may further move the entries identified as possible deletions to the end of the list after completing all other merge operations. In yet another aspect the media content list merge module may be further operable to order entries in the unified version of the media content list based on a latest timestamp position in the versions being merged.

Additionally, the device may further include a communications module operable to receive communicate the unified version of the media content list to a network device.

A network apparatus for reconciling concurrently existing versions of a media content list defines yet another aspect. As discussed infra., the apparatus may include one or more network devices, such as media content service-related servers, media content service-related kiosks or the like. As discussed infra. in relation to FIG. 23 kiosks may be geographically distributed throughout a media content distribution system as the end points for wireless media content delivery to communication devices, such as portable media players device and the like. The network apparatus includes a computer platform including a processor and a memory in communication with the processor. The apparatus additionally includes a media content list database stored in the memory and in communication with the processor. The media content list database is operable to store media content lists, each list associated with a corresponding media content user. The network apparatus additionally includes a media content list merge module stored in the memory and in communication with the processor. The media content list merge module is operable to determine that a plurality of versions of a media content list concurrently exist for an associated media content user and merge the versions of the media content list into a unified version.

In one aspect of the network apparatus the media content list database is operable to store media content priority lists, such as media content acquisition priority lists, each list associated with a corresponding media content user. Additionally, the media content priority database may be operable to store the unified version of the media content list as the corresponding media content user's current media content list.

In specific aspects of the network apparatus, the media content list merge module is further operable to compare the media content list in the database associated with a user each time a network connection is made to a communications device associated with the user. In such aspects, the media content list merge module may be further operable to compare timestamps associated with each entry in the list in the database associated with the media content user to each corresponding entry in the user's communication device list, such that a plurality of versions is determined to exist if one or more timestamps differ amongst entries in the media content lists.

In alternate aspects of the network apparatus the media content list merge module may be further operable to determine that more than two versions of the media content list concurrently exist. In such aspects, the media content list merge module may be further operable to merge of the more than two versions pairwise, such that the first pair of versions that are merged are the two versions that are earliest in time followed by the merging of the result of the first pair of versions with the next-in-time version and so on until all concurrently existing versions have been merged into a unified version.

In one aspect of the network apparatus the media content list merge module may be further operable to conduct the merge using one or more of the following merge rules. In one aspect the merge module may add all media content addition entries from the plurality of versions into the unified version of the media content list. In another aspect the merge module may delete a media content entry from the unified version if all of the plurality of versions include a deletion for that specific media content entry. In a further aspect the merge module may identify list entries as possible deletions if less than all of the plurality of versions include a deletion for that specific media content entry. In such aspects in which the merge module has identified list entries as possible deletions the module may further move the entries identified as possible deletions to the end of the list after completing all other merge operations. In yet another aspect the media content list merge module may be further operable to order entries in the unified version of the media content list based on a latest timestamp position in the versions being merged.

Additionally, the network apparatus device may further include a communications module operable to communicate the unified version of the media content list to a network device or to one or more communication devices associated with the media content user.

Thus, aspects are provided for reconciling different versions of media content lists that concurrently exist in a communication network. Aspects herein disclosed merge media content lists based on foreseen user expectations, taking into account typical user behavior. In one particular aspect the merge of media content lists includes the merge of media content acquisition priority lists that are maintained and routinely updated by the associated media content user.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which:

FIGS. 18-20 are block diagrams of media content lists illustrating a merge rule for ordering media content entries from lists having multiple timestamps into the unified media content list, according to another aspect;

DETAILED DESCRIPTION

Figure 1:
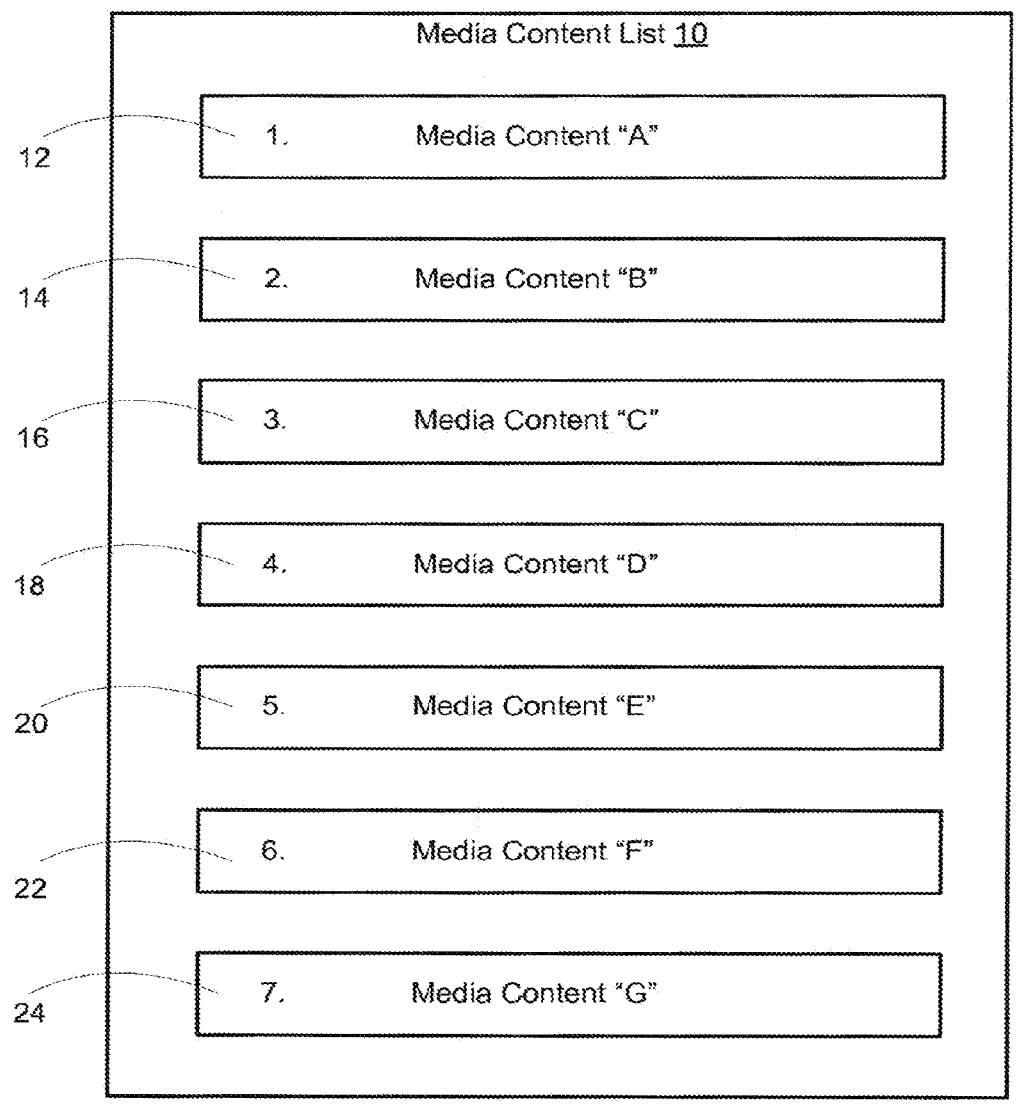
FIG. 1 is a block diagram of a media content list, in accordance with an aspect herein described.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component or module may be, but is not limited to being, a process running on a processor, a processor, an object, an executable, a thread of execution, a program, and/or a computer. By way of illustration, both an application running on a computing device and the computing device can be a component or module. One or more components or modules can reside within a process and/or thread of execution and a component may be localized on one computer and/or distributed between two or more computers. In addition, these components or modules can execute from various computer readable media having various data structures stored thereon. The components or modules may communicate by way of local and/or remote processes such as in accordance with a signal having one or more data packets, such as data from one component interacting with another component or module in a local system, distributed system, and/or across a network such as the Internet with other systems by way of the signal.

Furthermore, various aspects are described herein in connection with a communication device, such as a media content player device, for example a Portable Media Player (PMP) or a wireless communication device. A wireless communication device can also be called a system, device, subscriber unit, subscriber station, mobile station, mobile, mobile device, remote station, remote terminal, access terminal, user terminal, terminal, communication device, user agent, user device, or user equipment (UE). Further, a wireless communication device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Present aspects provide for methods, systems, devices, apparatus and computer program products for reconciling, otherwise referred to as merging, different versions of media content lists in a communication network. Referring to FIG. 1, according to one aspect, a media content list 10 is shown. The media content list 10 is generally a user configurable list of media content items. As such media content list 10 includes media content entries 12, 14, 16, 18, 20, 22 and 24 which correspond to media content item or files, such as Digital Video Disc (DVD) titles, Compact Disc (CD) titles, song titles, audio book/magazine, digital book/magazine titles, video game titles, or any other video, audio, multimedia or text media content. In one aspect, the media content list is an ordered list of media content that defines a user's chosen order related to a predetermined action. For example, in FIG. 1, media content entry 12 is the first in the order and is associated with media content "A", media content entry 14 is second in the order and is associated with media content "B", media content entry 16 is third in the order and is associated with media content "C", media content entry 18 is fourth in the order and is associated with media content "D", media content entry 20 is fifth in the order and is associated with media content "E", media content entry 22 is sixth in the order and is associated with media content "F", and media content entry 24 is seventh in the order and is associated with media content "G". The number of entries in media content list 10 is shown by way of example, as such, media content list 10 may have any number of entries as configured by the user.

In one aspect, the media content list 10 may define the user's preference or priority for acquiring media from a media content service. In such aspects, the media content service may store the media content list 10 on a network server or the like and may deliver media content to the user's communication device according to the order of the media content list. In other aspects, in which the media content service may stream media content, the user's communication device may capture the desired media content in accordance with the order of the media content list 10. The number of media content items that may be delivered to and/or captured by the communication device may be limited based on the user's subscription type to the media content service, the Digital Rights Management (DRM) related to specific media content, the device's storage capacity or any other factor. In another aspect, the media content list 10 may define the user's preference or priority for playing, viewing or otherwise executing the media content. In still other aspects, the media content list 10 may define the user's preference or priority for performing and other predetermined action that may require ordering of media content.

Figure 2:
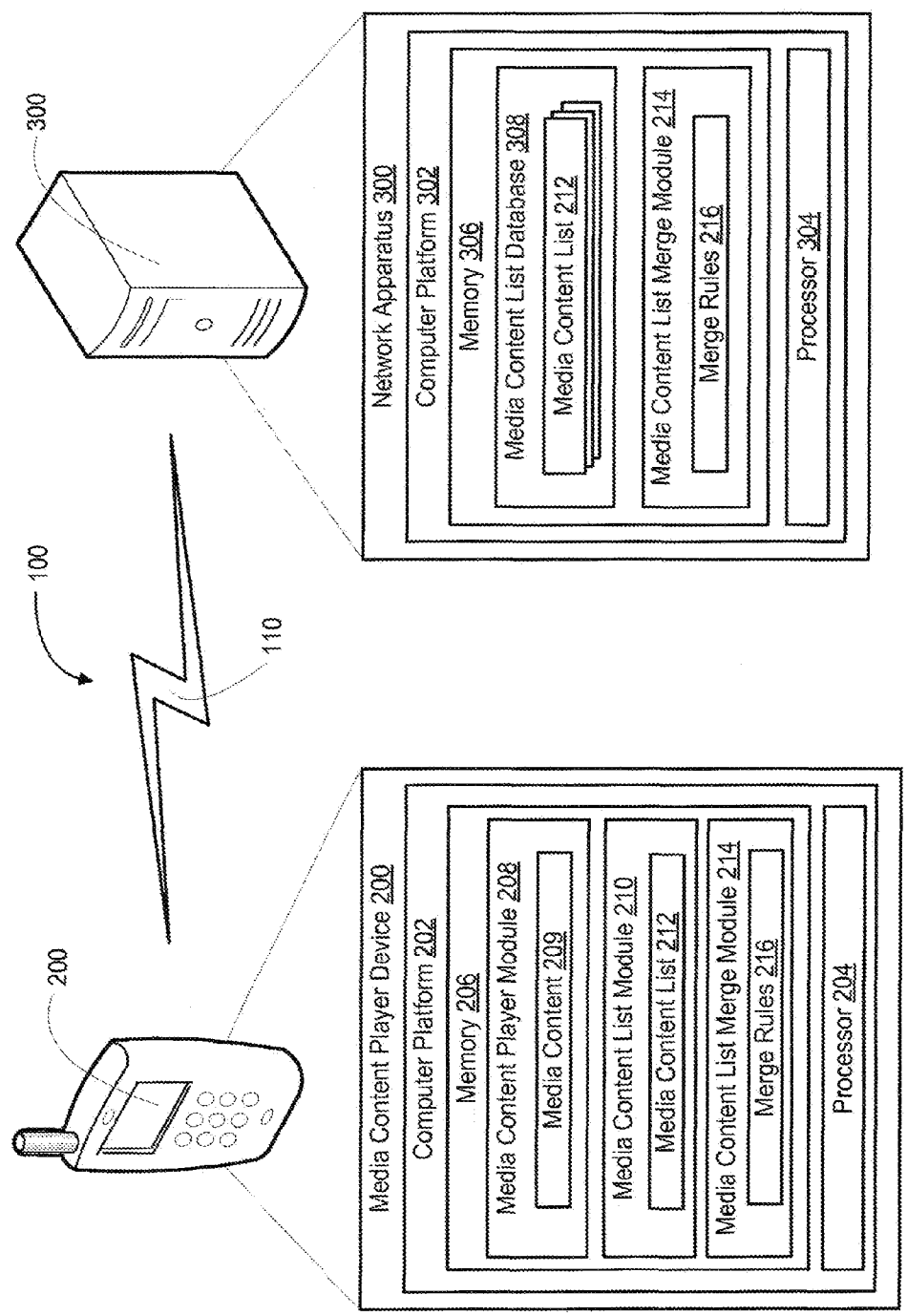
FIG. 2 is a schematic and block diagram illustration of a system for merging different versions of a media content list into a unified version, in accordance with an aspect.

Referring to FIG. 2, shown is a schematic and block diagram of a system 100 for reconciling different versions of media content lists in a communication network, in accordance with a present aspect. The system 100 includes a communication device 200, which in the illustrated example is a portable communication device, and a network apparatus 300 that in network communication via wireless network 110. The communication device 200 shown in FIG. 2 is a wireless communication device that may optionally embody a media player, however, in other aspects the communication device 200 may be a non-portable and/or wired device, which may communicate with the network apparatus 300 via a wired network, in addition to or in lieu of communicating via the wireless network 110.

The communication device 200 provides for a computer platform 202 that includes at least one processor 204 and a memory. The memory 206 of communications device 208 includes a media content list module that is in communication with the processor 204 and is operable to provide for a user configurable media content list 212. The media content list 212 provides for ordered listing of media content in which the order is based on user preference or priority and is associated with a predetermined action. For example, the predetermined action may be acquisition of the media content in the list, playing or executing the media content in the list or the like. The user of the communications device 200 may create a media content list 212 and subsequently edit or change the list to reflect the user's current preference for media content or the ordering of the media content. In this regard, a user may add additional media content to the list 212, delete media content from the list 212 and/or rearrange the order of media content in the list 212.

The memory 206 of communications device 208 additionally includes a media content list merge module 214 that is in communication with the processor 204 and is operable to determine that more than one version of the media content list 212 concurrently exists, merge the more than one versions of the media content list into a unified version of the list and store the unified version of the list 212 as the current version. As previously noted, different versions of the media content list 212 may exist under various scenarios. For example, the user may modify the list 212 while the device 200 does not have an active connection to the network, and store the modified list on the device 200. Prior to the device 200 establishing the network connection, the user may subsequently modify the list via a secondary device, such as a PC or the like with those modifications being communicated to the network. Thus, once the device 200 does establish a connection and provides the initial modifications to the network, the media content list merge module 214 provides for determining that two different versions of the list concurrently exist and a process for resolving the conflict between the lists.

In one aspect, the media content list merge module 214 may determine that more than one version exists by comparing the version of the media content list 212 stored at the communications device 200 with any network-based versions of the media content list 212, such as a version stored at network apparatus 300, each time the communications device 200 establishes a network connection with a media content service and/or any other network apparatus that stores a version of the media content list 212. As previously noted the network connection between the communication device 200 and the network apparatus 300 may be wireless or wired. In wireless aspects, the connection may be established with a content delivery kiosk, such as described in relation to FIG. 23 infra., and/or a Wi-Fi access point, such as a Wi-Fi access point established at a commercial entity or residential entity or the like. In wired aspects, the connection may be established with a PC via a suitable wired connection, such as Universal Serial Bus (USB) connection or the like.

In one aspect, timestamps are created for each media content entry in the list 212 and the timestamps are changed each time an entry is added, deleted and/or moved in the list. Thus, the comparison to determine if different versions exist may involve comparing an overall timestamp associated with the lists that reflects the latest update in the list or comparing the timestamps of the media content lists and determining that different versions exist if any of the entries have different timestamps.

Additionally, in one aspect, in which the merge process occurs at network apparatus 300, the media content list merge module 214 may be further operable to create a synchronization timestamp just prior to communicating the media content list 212 to the network device. The synchronization timestamp will reflect the current time just prior to communicating the media content list. The network apparatus 300 can use this timestamp to correct for any errors in the timestamp between the network apparatus 300 and the communication device 200. In this regard, the synchronization timestamp is used to synchronize absolute time by adjusting the timestamps associated with entries by the time difference between time indications provided when the list(s) are exchanged. It should be noted that use of the synchronization timestamp to correct errors assumes that the time to transfer the list between the network apparatus 300 and the communication device 200 is negligible for the purpose of timestamps.

Once a determination has been made that different versions of the media content list 212 concurrently exist, the media content list merge module 214 will implement one or more predetermined merge rules 216 to merge the different versions into a unified version of the media content list. The merge rules 216 may take into account a user's perceived behavior in terms of preference for the media content. Examples of merge rules 216 are discussed in relation to FIGS. 3-20 and FIG. 24, infra.

In one aspect the content list merge module 214 may merge one or more concurrently existing versions of a media content list according to the following process. Once the absolute times have been synchronized, a field is defined for each item in the lists being merged to reflect the current position in the list. The two lists with the oldest timestamps are concatenated and the concatenated list sorted, first by descending timestamps and second by increasing position field. Defining the merged position fields for the items proceeds from the top of the list until all items are defined by a field. The process is repeated until a position field is assigned to an entry. If a position field is unused, a position field is assigned to a list item; otherwise the position field is incremented by one. If a second entry with the same name exists it is removed from the list. The merge is completed by renumbering the position field with consecutive numbers from top to bottom beginning with the number one.

The memory 206 may optionally include a media content player module 208 that is in communication with processor 204 and is operable to play or otherwise execute media content 209. The media content 209 may include video file, audio file, multimedia file, gaming file, text file or the like, including but not limited to a motion picture, a television show, a video game, a CD, a song, an audio book, a digital book or the like. The media content 209 may be stored on the communications device 200, streamed to the communications device 200 or otherwise accessible to the communications device 200.

In other aspects, the communication device 200 may be configured to receive media content but may not be configured with a media content player module. For example, if the device does not include a display and/or audio output, the device may not include a media content player module. In such aspects, the communication device 200 may receive the media content and, subsequently, transfer the content to another device configured with a media content player module.

The system 100 additionally includes a network apparatus 300 that provides for a computer platform 302 including at least one processor 304 and a memory 306. The network apparatus, which may include more than one device, may be a network server associated with a media content-related service and/or one or more network kiosks geographically distributed in a media content delivery service or the like. The memory 306 may include a media content list database 308 that is in communication with the processor 304 and is operable to receive and store media content lists, each list associated with a different media content user. As such, media content list database 308 may store media content list 212 associated with the user of communications device 200. Once the communications device 200 establishes a network connection with network apparatus 300 and/or the network apparatus 300 establishes a network connection with the communications device 200, a determination may be made as whether different versions of media content list 212 exist and, if different versions are determined to exist, merge the different versions into a unified version and store the unified version as the current version at the communications device 200 and the network apparatus 300.

As such, the memory 306 of network apparatus 300 may include media content list merge module 214 that is in communication with the processor and is operable to determine that more than one version of the media content list 212 concurrently exists, merge the more than one versions of the media content list into a unified version of the list and store the unified version of the list 212 as the current version. It should be noted that the aspect depicted in FIG. 2, shows the media content list merge module 214 residing at both the communications device 200 and the network apparatus 300, and thus the merge process may occur at either the player device 200 or the network apparatus 300. In other aspects the merge process may be limited to being performed at the player device or the network apparatus, and thus, in those aspects the media content list merge module 214 may only reside at either the communications device 200 or the network apparatus 300. It should also be noted that while media content list merge module 214 is depicted as the same module residing at both the communications device 200 and the network apparatus 300, only the functionality of the module need be the same; thus, the hardware, firmware and/or software that comprise the module may differ between the player device 200 and the network apparatus 300.

Figure 3:
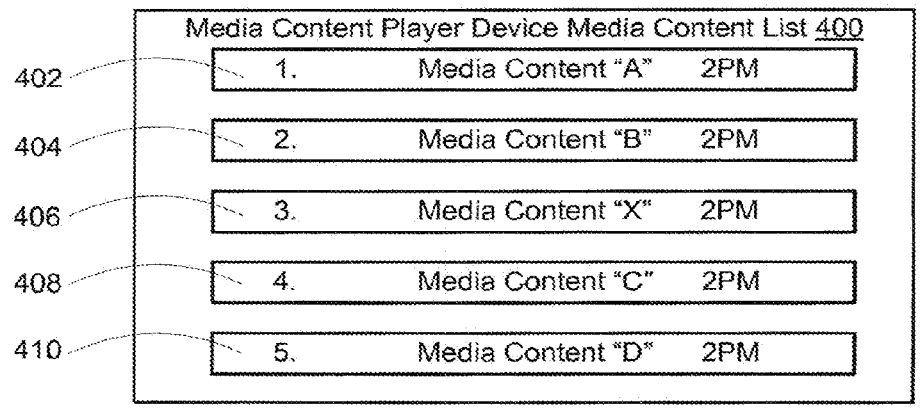
FIGS. 3-5 are block diagrams of media content lists illustrating a merge rule for adding media content entries to the unified media content list, according to another aspect.
Figure 4:
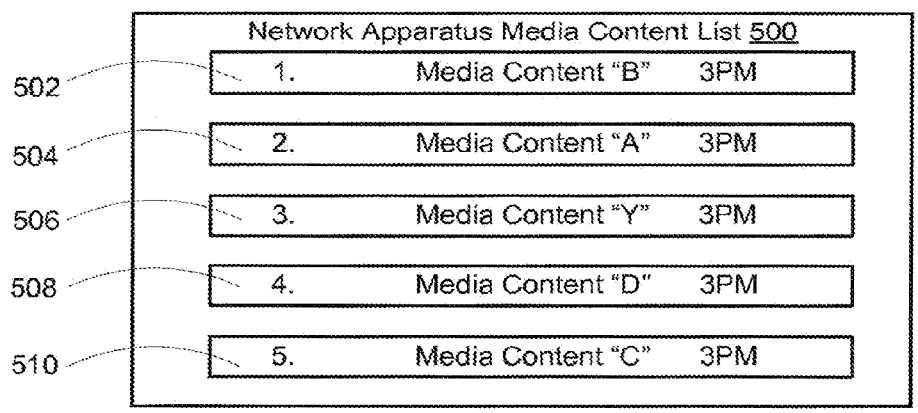
Figure 5:
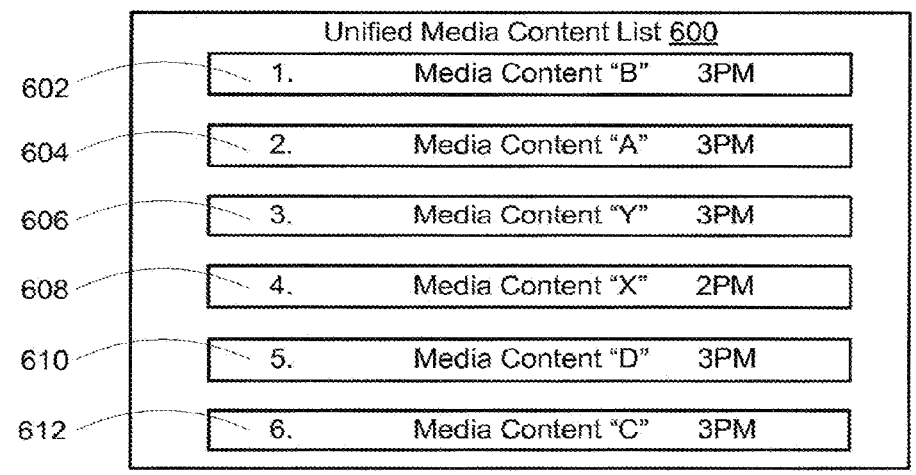

Referring to FIGS. 3-5, block diagrams are depicted of media content lists that illustrate a merge rule for adding media content entries to the unified version of the media content list. According to one aspect, a merge rule may be defined that provides for adding a media content entry to the unified version of the media content list if any of the versions that concurrently exist have added the media content. This merge rule takes into account the user behavior assumption that if a user added media content to the list, at any point in time, they desire to keep the added media content in the list.

FIG. 3 depicts the media content list 400 stored on the communications device 200. The list 400 includes five ordered entries 402, 404, 406, 408 and 410. The list 400 reflects an addition of entry 406, which corresponds to media content "X". The addition to the list occurred at 2 PM and thus, each of entries 402, 404, 406, 408 and 410, which correspond to media content "A", media content "B", media content "X", media content "C" and media content "D", respectively, are provided a 2 PM timestamp to reflect the time of the change to the list. Based on the user preference for ordering the media content in the list, entry 406 has been positioned in the third preference or priority position in list 400.

FIG. 4 depicts the media content list 500 stored on the network apparatus device 300, concurrently with media content list 400 being stored on the media content player (FIG. 3). The list 400 reflects an addition of entry 506, which corresponds to media content "Y" and changes in the ordering preference for entries 502 and 504, and entries 508 and 510. The addition and order changes occurred at 3 PM and thus, each of entries 502, 504, 506, 508 and 510, which correspond to media content "B", media content "A", media content "Y", media content "D" and media content "C", respectively, are provided a 3 PM timestamp to reflect the time of the change to the list.

FIG. 5 depicts the unified media content list 600 that results after merging of media content lists 400 and 500, depicted in FIG. 3 and FIG. 4, respectively. As previously noted, the exemplary merge rule according to one aspect provides for all additions to the any version of the media content list to be incorporated into the unified version. Thus, unified media content list 600 includes six ordered entries 602, 604, 606, 608, 610 and 612. Entries 606 and 608, which correspond to media content "Y" and "X", respectively and were added to media content lists 400 and 500, respectively, have been added to unified media content list 600. Entry 606, reflecting media content "Y" is given higher priority in the list that entry 608, reflecting media content "X", because the addition of media content "Y" occurred later in time than the addition of media content "X". Additionally, the order changes that occurred in list 500, i.e., media content "B" listed ahead of media content "A" and media content "D" listed ahead of media content "C" are reflected in the unified version because they reflect the latest in time version of the list.

Figure 6:
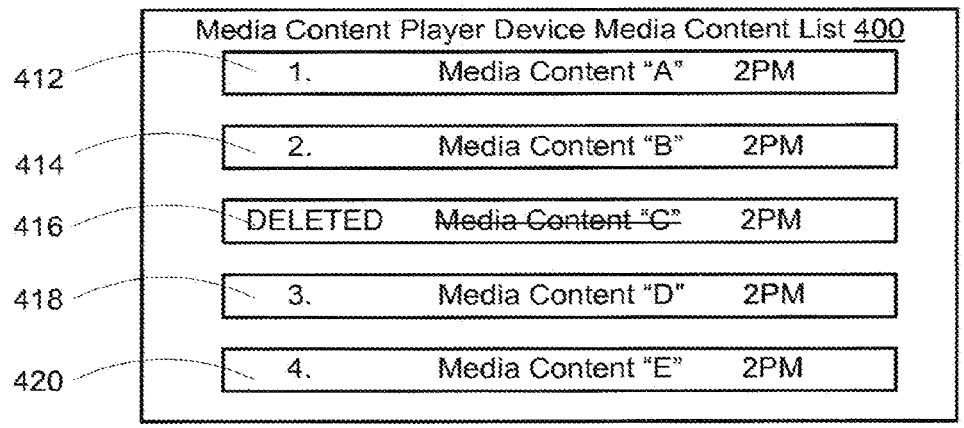
FIGS. 6-8 are block diagrams of media content lists illustrating a merge rule for deleting media content entries in the unified media content list, in accordance with an aspect.
Figure 7:
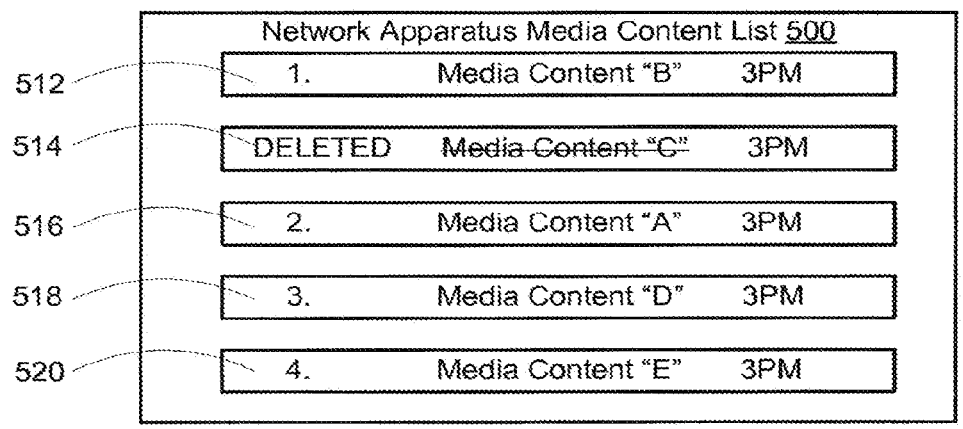
Figure 8:
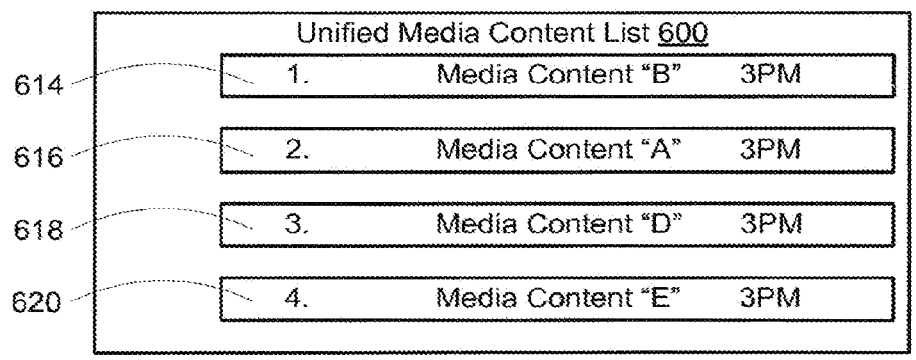

Referring to FIGS. 6-8, block diagrams are depicted of media content lists that illustrate a merge rule for deleting media content entries in the unified version of the media content list. According to one aspect, a merge rule may be defined that provides for deleting a media content entry in the unified version of the media content list only if all of the versions that concurrently exist have deleted the media content. This merge rule takes into account the user behavior assumption that if a user has deleted the media content from all concurrently existing, then the user has shown the desire to delete the entry from the unified list.

FIG. 6 depicts the media content list 400 stored on the communications device 200. The list 400 includes four ordered entries 412, 414, 418, and 420, corresponding to media content "A", media content "B", media content "D" and media content "E", respectively. The list 400 also notes that entry 416, which corresponds to media content "C", has been deleted from list 400. The timestamp for the entries reflects that the deletion occurred at 2 PM. FIG. 7 depicts the media content list 500 stored on the network apparatus device 300, concurrently with media content list 400 being stored on the media content player (FIG. 6). The list 500 includes four ordered entries 512, 514, 518 and 520, corresponding to media content "B", media content "A", media content "D" and media content "E", respectively. The list 500 also notes that entry 516, which corresponds to media content "C", has been deleted from list 500. In addition, list 500 reflects an order change, in that, media content "B" (entry 512) has been moved ahead of media content "A" (entry 616). The timestamp for the entries reflects that the deletion and the order changes occurred at 3 PM.

FIG. 8 depicts the unified media content list 600 that results after merging of media content lists 400 and 500, depicted in FIG. 6 and FIG. 7, respectively. As previously noted, the exemplary merge rule according to one aspect provides for an entry to be deleted from the unified version if all of the concurrently existing versions provide for deletion of the entry. Thus, unified media content list 600 includes four ordered entries 614, 616, 618, and 620, corresponding to media content "B", media content "A", media content "D" and media content "E", respectively. The entry for media content "C" is not included in the unified media content list 600 because it was deleted from all of the concurrently existing versions, specifically, in this example, media content list 400 stored on the player device and media content list 500 stored on the network apparatus. Additionally, unified media content list 600 reflects a media content order consistent with list 500, which is the list having the latest-in-time timestamps associated with the entries.

Figure 9:
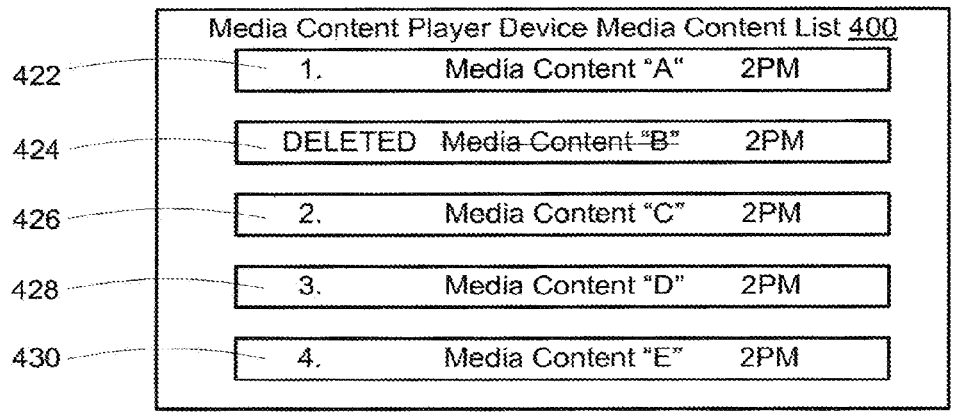
FIGS. 9-11 are block diagrams of media content lists illustrating a merge rule for identifying media content entries as possible deletions in the unified media content list, according to a further aspect.
Figure 10:
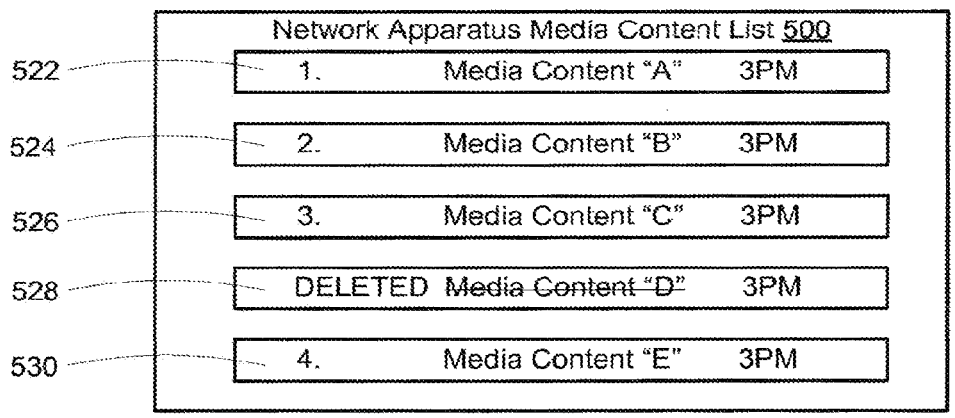
Figure 11:
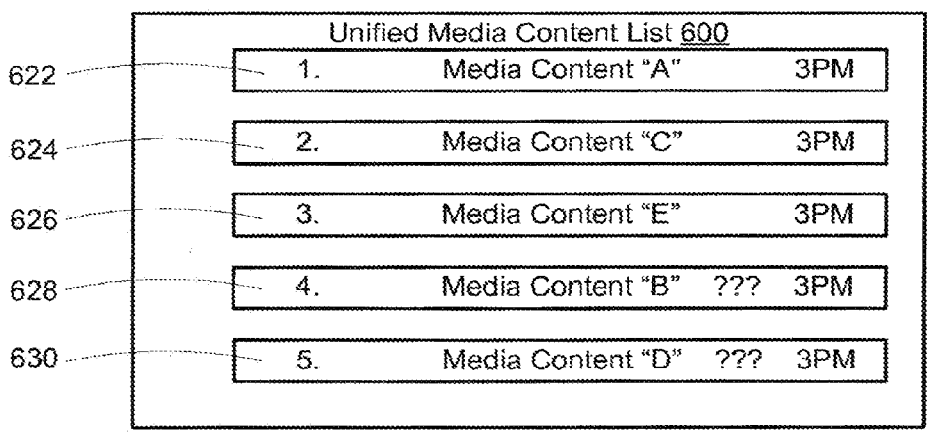

Referring to FIGS. 9-11, block diagrams are depicted of media content lists that illustrate a merge rule for identifying media content entries as possible deletions in the unified version of the media content list. According to one aspect, a merge rule may be defined that provides for identifying a media content entry as a possible deletion in the unified version of the media content list if less than all of the versions that concurrently exist have deleted the media content. In addition, another merge rule calls for moving the identified possible deletions to the end of the unified media content list. This merge rule takes into account the user behavior assumption that if a user has deleted the media content from less that all of the versions they may not desire to delete the media content. Additionally, by moving the media content identified as possible deletions to the end of the list, the merge rule lessens the likelihood of performing the activity related to the ordered list, such as acquiring the media content or the like. Once moved to the end of the list, the user has the option of deleting the media content or unmarking the media content as a possible deletion and moving the media content to a desired position in the list.

In alternate aspects, the media content list merge module may be configured to provide a user-selectable option for "quick delete", i.e., deleting all media content entries from merged list even if the deletion occurs in only one of the versions of the list. If the user selects this option, it would negate the need for any entries to be marked as possible deletions in the merged list, since all deletions, regardless of version-to-version consistency, would be deleted in the merged list. Additionally, the media content list merge module may be configured to provide a further user-selectable option for differentiating between media content that has been selected but not received versus media content that has been received and is stored on the communication device. For example, a user may select to quick delete less than all version deletions of media content selected but not yet received and mark as possible deletions less than all version deletions of media content received and currently stored. Similarly, the media content list merge module may be configured with other user-selectable options, such as distinguishing between deletions on versions entered and stored at the communication device versus versions entered and stored at the network apparatus, such that only versions entered and stored at the communication device or entered and stored at the network apparatus are configured for the "quick delete" option.

FIG. 9 depicts the media content list 400 stored on the communications device 200. The list 400 includes four ordered entries 422, 426, 428, and 430, corresponding to media content "A", media content "C", media content "D" and media content "E", respectively. The list 400 also notes that entry 424, which corresponds to media content "B", has been deleted from list 400. The timestamp for the entries reflects that the deletion occurred at 2 PM. FIG. 10 depicts the media content list 500 stored on the network apparatus device 300, concurrently with media content list 400 being stored on the media content player (FIG. 9). The list 500 includes four ordered entries 522, 524, 526 and 530, corresponding to media content "A", media content "B", media content "C" and media content "E", respectively. The list 500 also notes that entry 528, which corresponds to media content "D", has been deleted from list 500. The timestamp for the entries reflects that the deletion occurred at 3 PM.

FIG. 11 depicts the unified media content list 600 that results after merging of media content lists 400 and 500, depicted in FIG. 9 and FIG. 10, respectively. As previously noted, the exemplary merge rule according to one aspect provides for an entry to be identified as a possible deletion in the unified version if less than all of the concurrently existing versions provide for deletion of an entry. Thus, unified media content list 600 includes three ordered entries 622, 624 and 626, corresponding to media content "A", media content "C", and media content "E", respectively. The list also includes entries 628 and 630, which correspond to media content "B" and media content "D", respectively. Entries 628 and 630 have been identified, via a question mark, as possible deletions based on their deletion from less than all of the concurrently existing versions of the media content list. In addition to being identified as possible deletions, entries 628 and 639 have been moved to the end of the unified media content list 600 to insure that the predetermined activity associated with the ordered list, such as acquisition of the media content, does not occur relative to the possible deletion of the entries.

Figure 12:
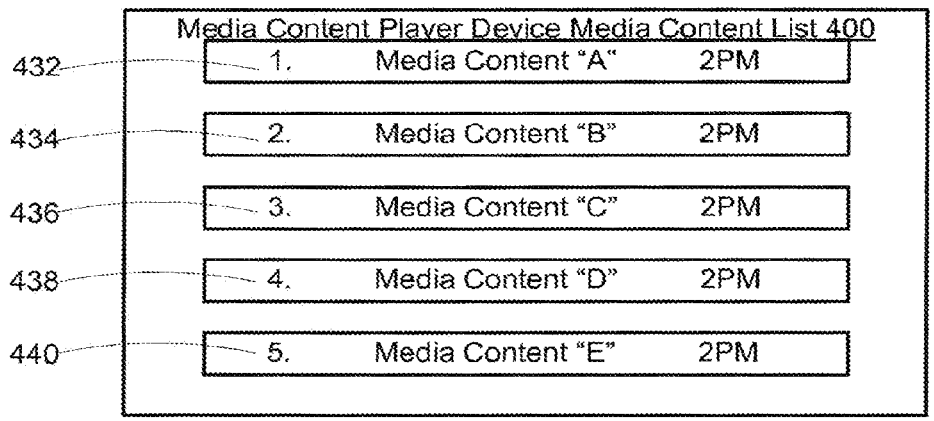
FIGS. 12-14 are block diagrams of media content lists illustrating a merge rule for ordering media content entries from lists having uniform timestamps into the unified media content list, according to yet another aspect.
Figure 13:
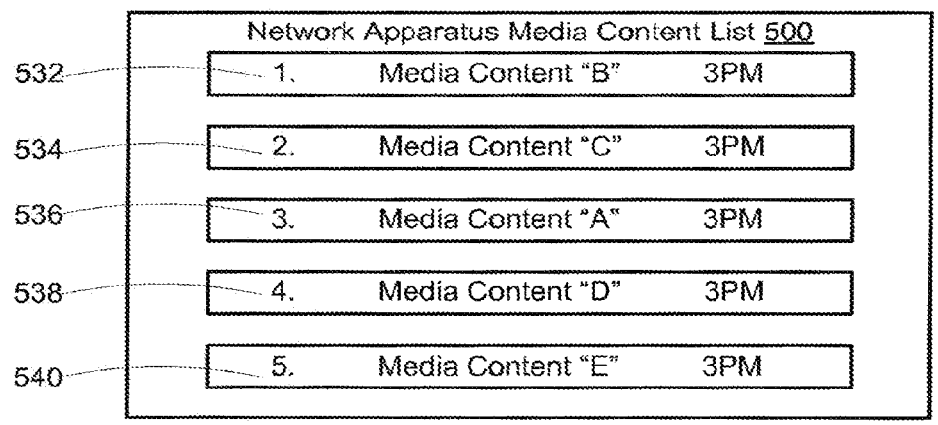
Figure 14:
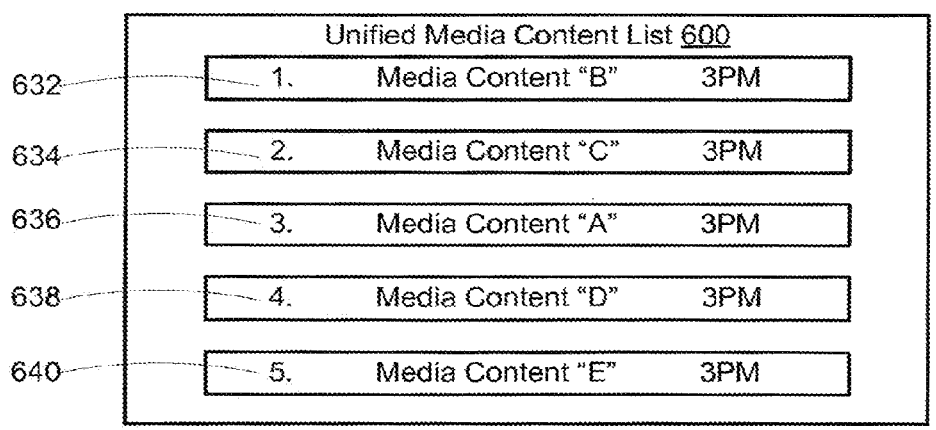

Referring to FIGS. 12-14, block diagrams are depicted of media content lists that illustrate a merge rule for ordering media content entries to the unified version of the media content list. According to one aspect, a merge rule may be defined that provides for ordering media content entries in the unified version of the media content list according to their respective position in the different versions based on the latest timestamp. Thus, if conflicting positions result from the different versions, they are ordered with the latest time stamped entry appearing first in the unified list. This merge rule takes into account the user behavior assumption that the user prefers the latest in time reordering of entries in the media content list.

FIG. 12 depicts the media content list 400 stored on the communications device 200. The list 400 includes five ordered entries 432, 434, 436, 438 and 440, which correspond to media content "A", media content "B, media content "C", media content "D" and media content "E", respectively. The timestamp for the entries reflects that the list was created or the order changed at 2 PM.

FIG. 13 depicts the media content list 500 stored on the network apparatus device 300, concurrently with media content list 400 being stored on the media content player (FIG. 12). The list 500 includes five ordered entries 532, 534, 536, 538 and 540, which correspond to media content "B", media content "C, media content "A", media content "D" and media content "E", respectively. The timestamp for the entries reflects that the list was created or the order changed at 3 PM FIG. 14 depicts the unified media content list 600 that results after merging of media content lists 400 and 500, depicted in FIG. 12 and FIG. 13, respectively. As previously noted, the exemplary merge rule according to one aspect provides for entries that have been moved to be ordered according to their position with the latest-in-time timestamp. Thus, unified media content list 600 includes five ordered entries 632, 634, 636, 638 and 640, corresponding to media content "B", media content "C, media content "A", media content "D" and media content "E", respectively. The unified list 600 reflects the order of the network apparatus list 500, because this list reflects timestamps associated with the entries that are latest in time.

Figure 15:
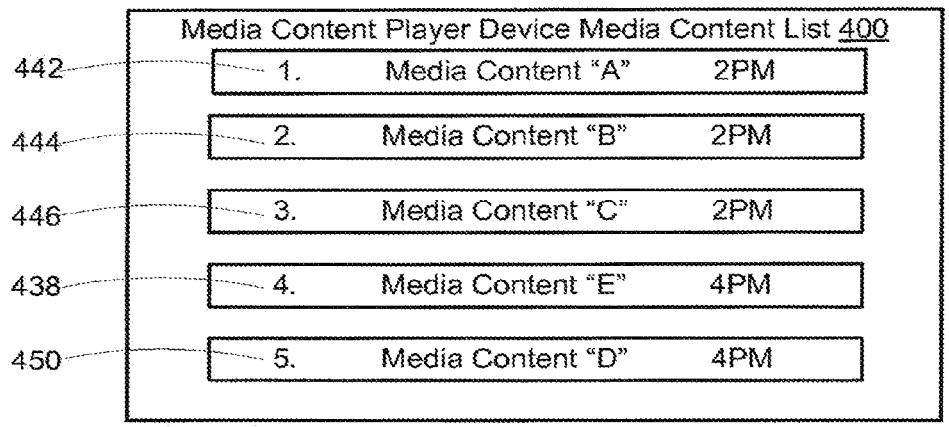
FIGS. 15-17 are block diagrams of media content lists illustrating a merge rule for ordering media content entries from lists having multiple timestamps into the unified media content list, according to another aspect.
Figure 16:
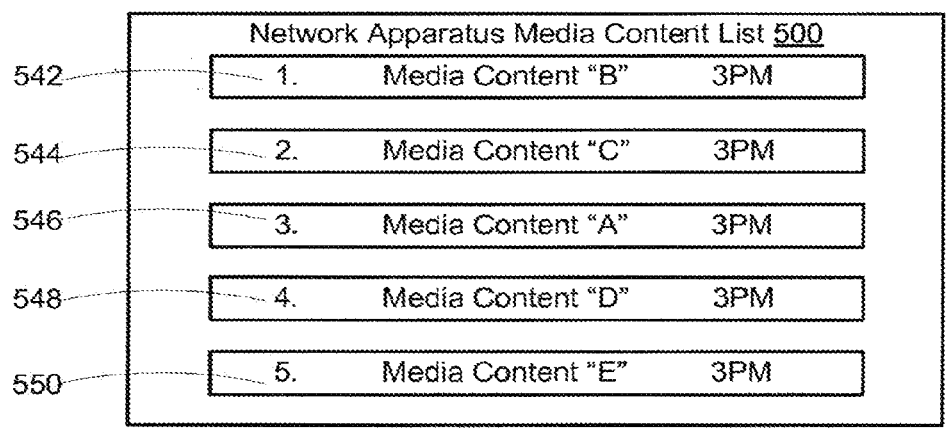
Figure 17:
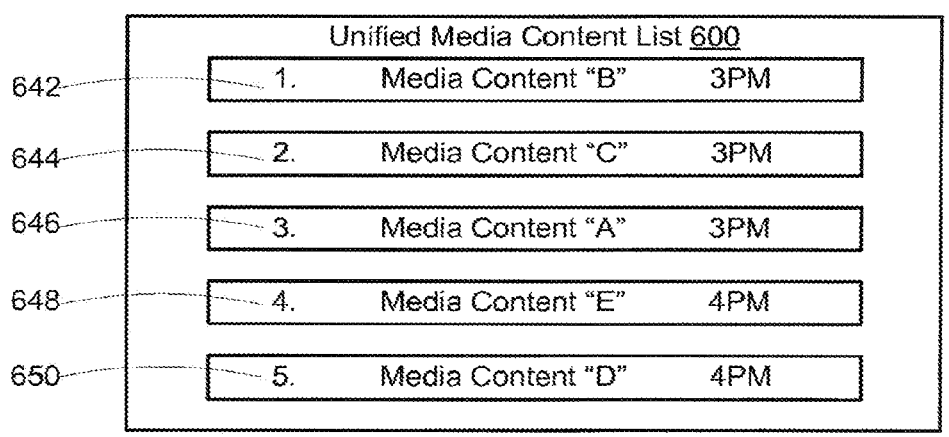

Referring to FIGS. 15-17, block diagrams are depicted of media content lists that illustrate another merge rule for ordering media content entries to the unified version of the media content list. According to one aspect, a merge rule may be defined that provides for ordering media content entries in the unified version of the media content list according to their respective position in the different versions based on the latest timestamp. Thus, if conflicting positions result from the different versions, they are ordered with the latest time stamped entry appearing first in the unified list.

FIG. 15 depicts the media content list 400 stored on the communications device 200. The list 400 includes five ordered entries 442, 444, 446, 448 and 450, which correspond to media content "A", media content "B, media content "C", media content "E" and media content "D", respectively. The timestamp for the entries reflects that the list was created or initial changes were made at 2 PM, followed by changes to the order of entries 438 and 450, which occurred at 4 PM.

FIG. 16 depicts the media content list 500 stored on the network apparatus device 300, concurrently with media content list 400 being stored on the media content player (FIG. 15). The list 500 includes five ordered entries 542, 544, 546, 548 and 550, which correspond to media content "B", media content "C, media content "A", media content "D" and media content "E", respectively. The timestamp for the entries reflects that the list was created or the order changed at 3 PM FIG. 17 depicts the unified media content list 600 that results after merging of media content lists 400 and 500, depicted in FIG. 15 and FIG. 16, respectively. As previously noted, the exemplary merge rule according to one aspect provides for entries that have been moved to be ordered according to their position with the latest-in-time timestamp. Thus, unified media content list 600 includes five ordered entries 642, 644, 646, 648 and 650, corresponding to media content "B", media content "C", media content "A", media content "E" and media content "D", respectively. The unified list 600 reflects the entries 642, 644 and 646 as positioned in the network apparatus list 500 based on later timestamp of 3 PM for these entries versus the 2 PM timestamp for the corresponding entries in the communication device list 400. Additionally, the unified list 600 reflects the entries 640 and 642 as positioned in the communication device list 400 based on later timestamp of 4 PM for these entries versus the 3 PM timestamp for the corresponding entries in the network apparatus list 500.

Referring to FIGS. 18-20, block diagrams are depicted of media content lists that illustrate another merge rule for ordering media content entries to the unified version of the media content list. According to one aspect, a merge rule may be defined that provides for ordering media content entries in the unified version of the media content list according to their respective position in the different versions based on the latest timestamp. Thus, if conflicting positions result from the different versions, they are ordered with the latest time stamped entry appearing first in the unified list.

FIG. 18 depicts the media content list 400 stored on the communications device 200. The list 400 includes five ordered entries 452, 454, 456, 458 and 460, which correspond to media content "A", media content "B", media content "D", media content "C" and media content "E", respectively. The timestamp for the entries reflects that the list was created or initial changes were made at 2 PM, followed by changes to the order of entries 456 and 458, which occurred at 4 PM.

FIG. 19 depicts the media content list 500 stored on the network apparatus device 300, concurrently with media content list 400 being stored on the media content player (FIG. 18). The list 500 includes five ordered entries 552, 554, 556, 558 and 560, which correspond to media content "B", media content "C, media content "A", media content "D" and media content "E", respectively. The timestamp for the entries reflects that the list was created or the order changed at 3 PM FIG. 20 depicts the unified media content list 600 that results after merging of media content lists 400 and 500, depicted in FIG. 18 and FIG. 19, respectively. As previously noted, the exemplary merge rule according to one aspect provides for entries that have been moved to be ordered according to their position with the latest-in-time timestamp. Thus, unified media content list 600 includes five ordered entries 652, 654, 656, 658 and 660, corresponding to media content "B", media content "D", media content "C", media content "A" and media content "E", respectively. The unified list 600 reflects positions based on the latest timestamp for entries in the communication list 400 and the media content list 500. Additionally, based on the rule that conflicts are resolved based on providing higher positioning to entries having a later timestamp, media content "D" and media content "C" are provided higher positions in the unified list, specifically the second and third positions.

Figure 21:
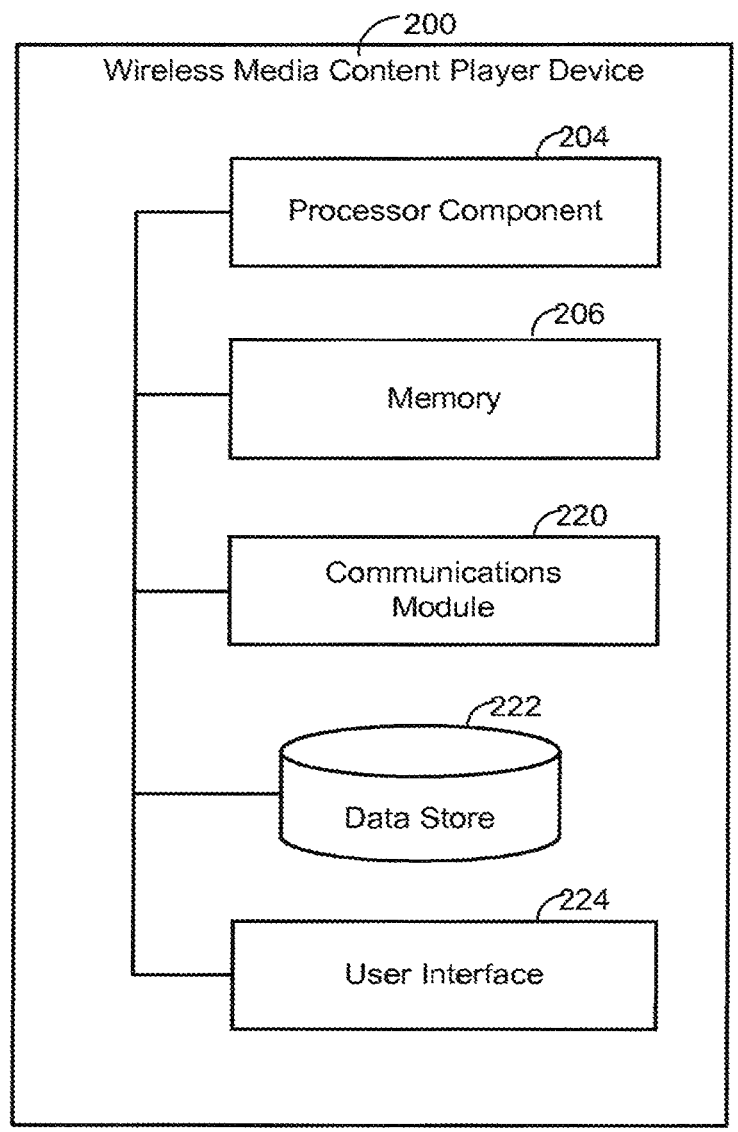
FIG. 21 is a block diagram of a wireless communications device, according to an aspect.

Referring to FIG. 21, in one aspect, communications device 200 may comprise a wireless device, such as a standalone PMP or a PMP incorporated in another device, such as a wireless telephone or the like. As can be appreciated, in addition to optionally providing media content player capability and the wireless communications device 200 provides for wireless communication via one or more of a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques. The wireless communications device 200 may use any of these wireless communication systems to receive or otherwise acquire media content.

Wireless communications device 200 includes processor component 204 for carrying out processing functions associated with one or more of components and functions described herein. Processor component 204 can include a single or multiple sets of processors or multi-core processors. Moreover, processing component 204 can be implemented as an integrated processing system and/or a distributed processing system.

Wireless communications device 200 further includes a memory 206, such as for storing local versions of applications being executed by processor component 204. Memory 206 can include random access memory (RAM), read only memory (ROM), and a combination thereof. Additionally, in some aspects (not shown in FIG. 21), memory 204 includes media content player module 208, media content list module 210 and/or media content list merge module 214.

Further, wireless communications device 200 includes a communications component 220 that provides for establishing and maintaining communications with one or more parties utilizing hardware, software, and services as described herein. Communications component 220 may carry communications between components on wireless communications device 200, as well as between wireless communications device 200 and external network devices, such as devices located across a communications network and/or devices serially or locally connected to wireless communications device 200. For example, communications component 220 may include components necessary to establish a network communication with network apparatus 300 (not shown in FIG. 21) and to receive and/or communicate the unified version of the media content list (not shown in FIG. 21).

Additionally, wireless communications device 200 may further include a data store 222, which can be any suitable combination of hardware and/or software that provides for mass storage of information, databases, and programs employed in connection with aspects described herein. Optionally, in some aspects, data store 220 may provide storage for media content, and/or the media content list (not shown in FIG. 21).

Wireless communications device 200 may additionally include a user interface component 224 operable to receive inputs from a user of wireless communications device 200, and to generate outputs for presentation to the user. User interface component 224 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 224 may include one or more output devices, including but not limited to a display, a speaker, a haptic feedback mechanism, a printer, any other mechanism capable of presenting an output to a user, or any combination thereof. In accordance with present aspects, the interface component 224 may include requisite inputs for configuring the media content list, and displays for displaying the media content list. None of the specific interface components are shown in FIG. 21 for the sake of brevity.

Figure 22:
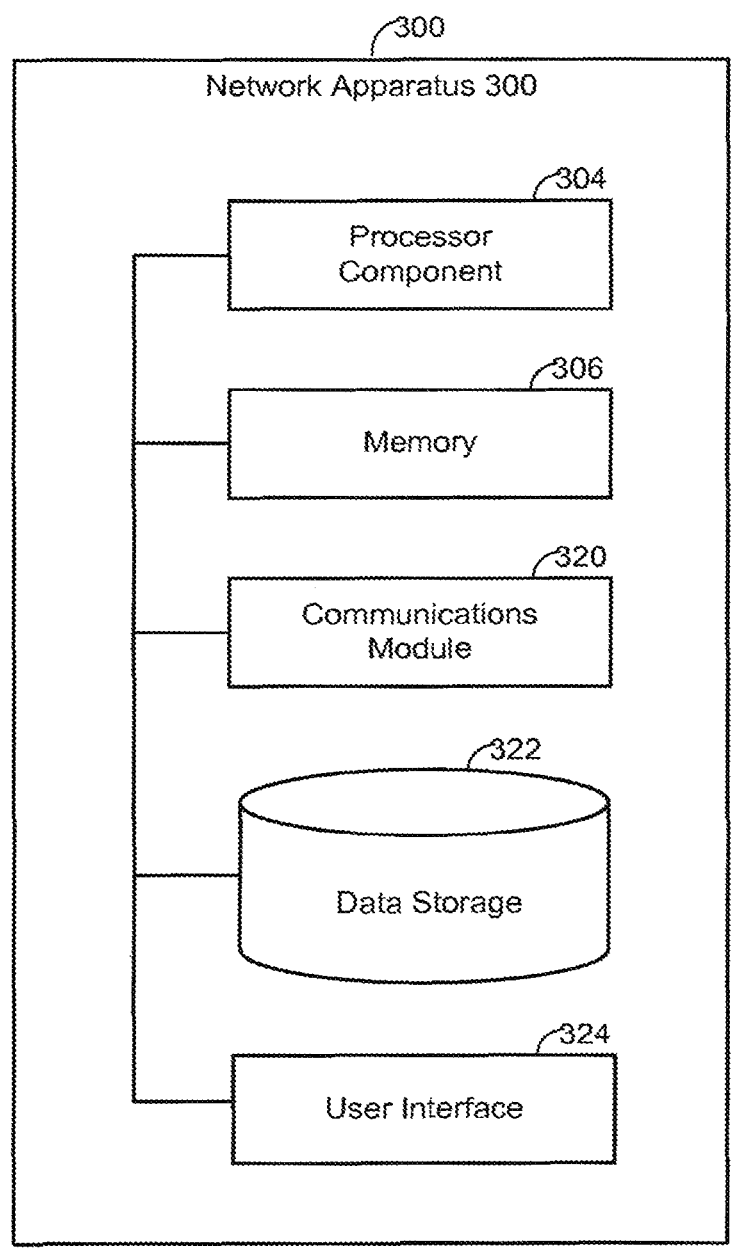
FIG. 22 is a block diagram of a network apparatus, according to an aspect.

Referring to FIG. 22, a block diagram representation of a network apparatus 300 is shown, according to another aspect. Network apparatus 300 includes any type of network-based communication device, such as a network server operable on a communication network or a network kiosk operable on a communication network. As previously noted and discussed infra. in relation to FIG. 23, kiosks may be geographically distributed throughout a media content distribution system as the end points for wireless media content delivery to communication devices, such as portable media players device and the like. The communication network may be a wired or wireless communication system, or a combination of both, and includes the wireless network on which a wireless communications device operates.

Network apparatus 300 includes a processor component 304 for carrying out processing functions associated with one or more of components and functions described herein. Processor component 304 can include a single or multiple sets of processors or multi-core processors. Moreover, processor component 304 can be implemented as an integrated processing system and/or a distributed processing system.

Network apparatus 300 further includes a memory 306, such as for storing local versions of applications being executed by processor component 304. Memory 306 can include random access memory (RAM), read only memory (ROM), and a combination thereof. Optionally, in some aspects, memory 306 includes the media content list database 308 and/or the media content list merge module 214.

Further, network apparatus 300 includes a communications component 320 that provides for establishing and maintaining communications with one or more parties utilizing hardware, software, and services as described herein. Communications component 320 may carry communications between components on network apparatus 300, as well as between network apparatus 300 and external devices, such as wireless communications device 200, and including devices located across wireless communications network, wired networks and/or broadcast networks and/or devices serially or locally connected to network apparatus 300. In one aspect, communications component 320 is operable for communicating media content and/or media content lists, such as the unified media content list to and from network apparatus 300.

Additionally, network apparatus 300 may further include database 322, which can be any suitable combination of hardware and/or software that provides for mass storage of information, databases, and programs employed in connection with aspects described herein. In certain aspects, database 322 may store t media content and/or the media content list database 308.

Network apparatus 300 may additionally include a user interface component 324 operable to receive inputs from a user of network apparatus 300, and to generate outputs for presentation to the user. User interface component 324 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 324 may include one or more output devices, including but not limited to a display, a speaker, a haptic feedback mechanism, a printer, any other mechanism capable of presenting an output to a user, or any combination thereof.

Figure 23:
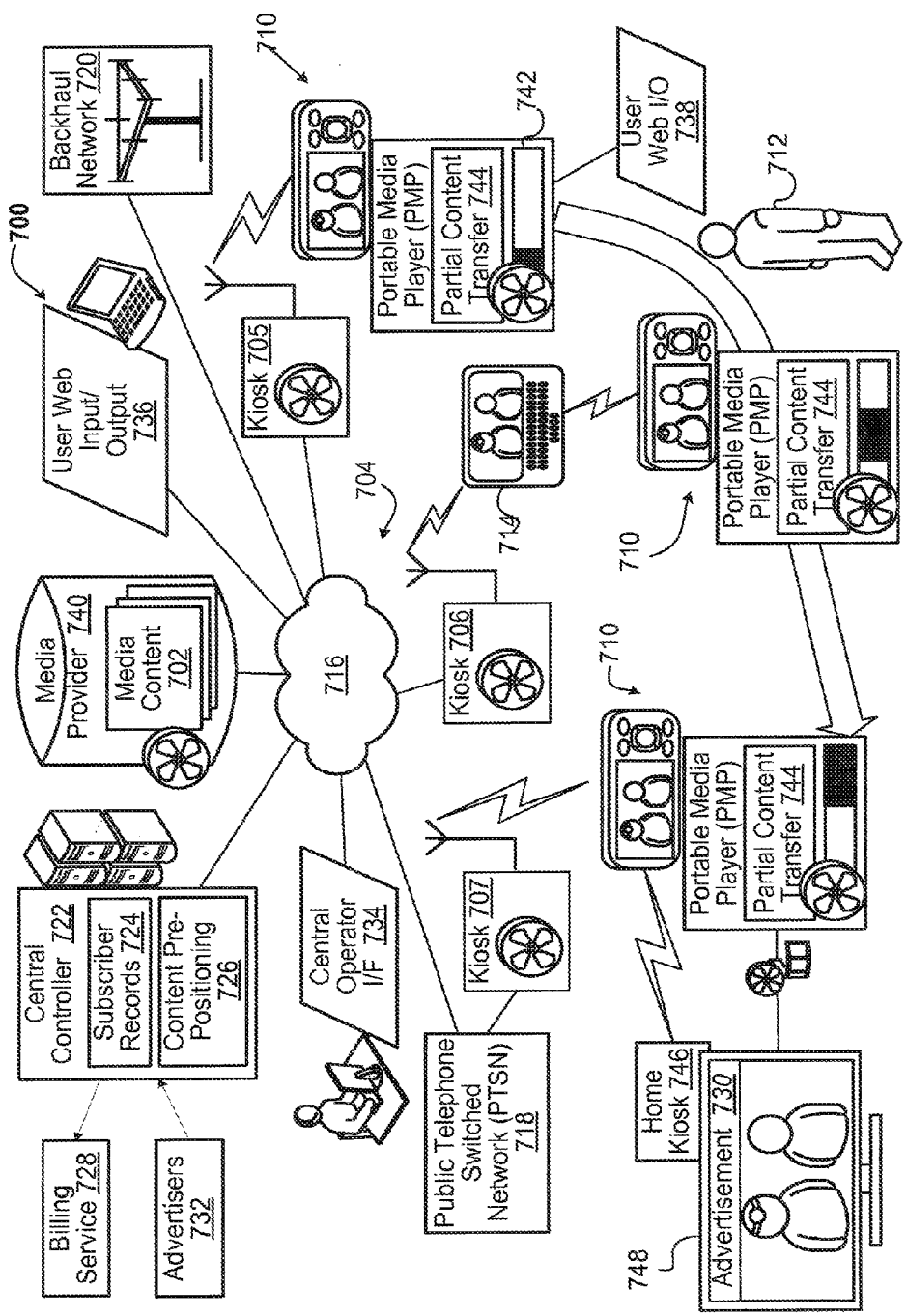
FIG. 23 is a schematic diagram of an exemplary system for delivering media content to a communication device, in accordance with another aspect.

With reference to FIG. 23, a content delivery system 700 is shown that may be used in conjunction with present aspects to deliver media content to wireless communications devices. Specifically, in aspects in which the media content list is a media content acquisition priority list, the system 700 may be relied upon to deliver media content to the device in accordance with the ordered priority for acquiring media content as defined by the list. The system 700 shown in FIG. 23 improves upon delivery of media content 702 over a communication network 704 by utilizing a plurality of strategically placed vendor kiosks 705, 706, 707 that have an economic incentive to service a plurality of wireless-capable portable devices. It should be appreciated that portable devices can comprise a number of types handheld or carried apparatus with a unitary or distributed construction that perform a more dedicated function (e.g., solely media player) or are a converged device having media player as one function (e.g., smart phone). In the illustrative depiction, a population of wireless-capable portable devices, including a converged handheld computer 714, are depicted as including a personal media player (PMP) 710 carried by a user 712.

The communication network 704 can provide communication channels of varying data throughput, interoperability and coverage areas. For example, portions of the communication network 704 can comprise a public or private Internet 716, public telephone switched network (PSTN) 718, and/or an over-the-air broadcast carrier (e.g., unicast, multicast, one-way, two-way, WiMax, cellular telephone, etc.), depicted as a backhaul network 720 for media content distribution purposes. In the exemplary depiction, the communication channel via the PTSN 718 to vendor kiosk 707 is a very economical, albeit slow, for downloading large media files and provides an opportunity for prepositioning popular catalog selections well in advance of a user 712 being in proximity.

A network controller 722 manages the content delivery system 700 by maintaining a subscriber record data structure 724 and content pre-positioning tracking data structure 726 that is reflected in updated catalogs. The central controller 722 relays billing and credits to a billing service 728 and receives advertisements 730 from advertisers 732 for merging or coupling in some instances with delivered media content 702. A central operator interface (I/F) 734 can provide human interaction/configuration of central controller 722, operator assistance via the PTSN 718 with users 712, or facilitating a user web input/output (I/O) service 736 for subscribing or for receiving selections. Web-enabled portable devices, such as depicted at 738, can access this web I/O 734 directly. Media providers 740 that provide access to the media content 702 can facilitate data rights management (DRM) for end user access and use limitations on the media content 702.

In an illustrative use case, the PMP 710 enters a coverage area of the kiosk 706, resulting in receiving a first portion of a selection, which can include user indication as depicted at 742. Upon leaving the coverage area or shutdown of the PMP 710, a partial content transfer module 744 verifies the integrity of the partial transfer, prepares a report to the network for the next opportunity to upload, and in some instances formats the partial transfer for playback. Subsequently, the PMP 710 forms an ad hoc network with another subscribing portable device 714 that is able to transfer another portion of the selection previously downloaded or relayed from kiosk 706. Subsequently, the PMP 710 completes the download from kiosk 707, which can be the same device as a home kiosk 746 that archives or supplements the downloaded selection from the PMP 710. The home kiosk 746 (e.g., a set-top box, home computer, dedicated device, etc.) or the PMP 710, in some aspects, can then stream or download the media content for playback on a full-size display monitor 748.

Figure 24:
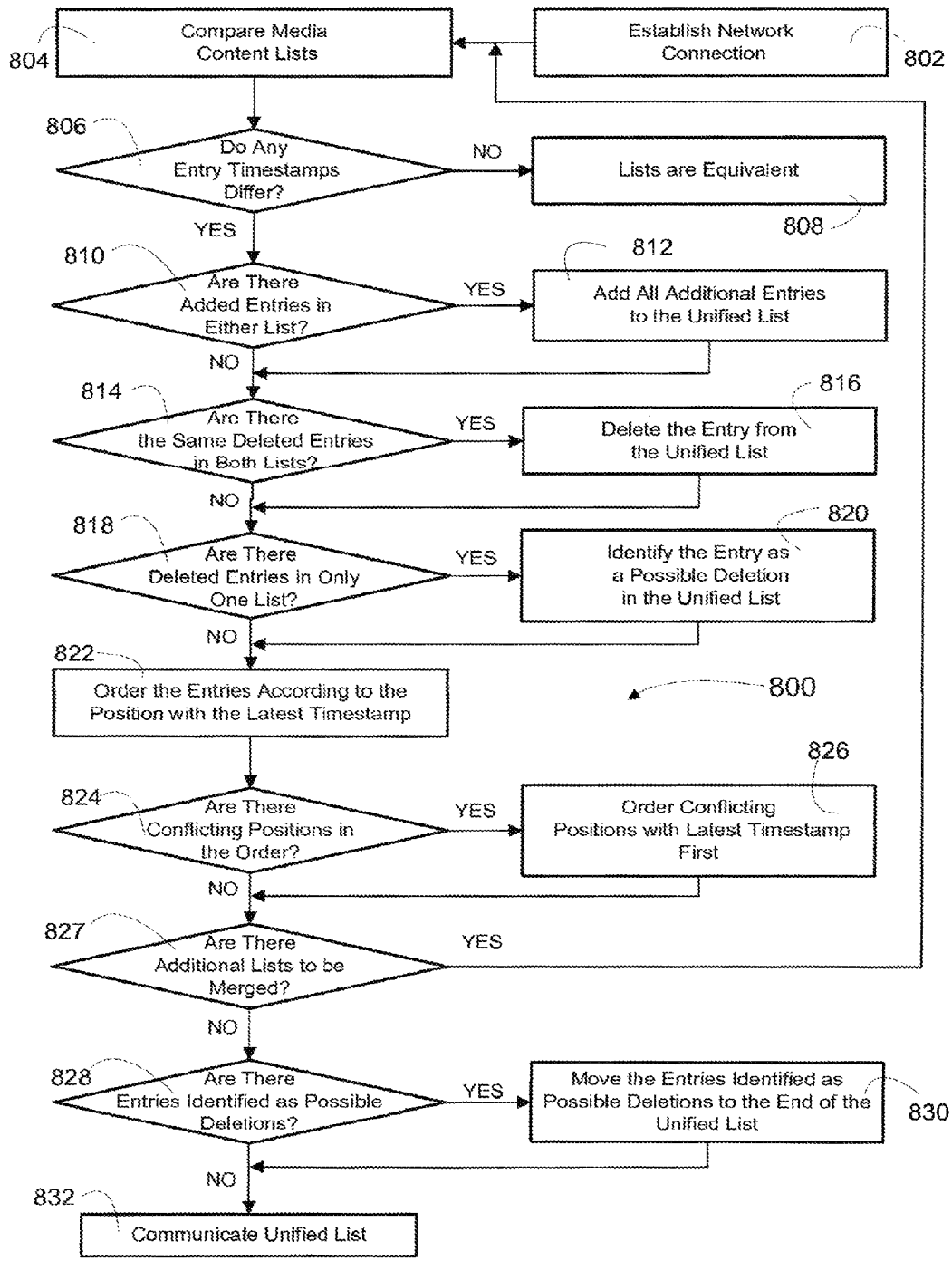
FIG. 24 is flow diagram of a method for reconciling different versions of media content lists concurrently existing in a communication network, according to yet another aspect.

Referring to FIG. 24, a flow diagram is shown of a method 800 for reconciling or merging different versions of a media content list concurrently existing in a communications network, according to a further aspect. At Event 802, a network connection is established between two different networked entities that store a media content list associated with a specific media content user. The network connection may be a wireless or wired connection. The networked entities may include a user's communication device, such as wireless or wired media content player device or any other user device having network connection. From the network perspective, the networked entities may be any network apparatus, such as network servers or network kiosks associated with a service provider, such as a media content service provider or the like. As such, the network connection may be initiated by the user-controlled devices or by the network-side apparatus.

At Event 804, based on the established network connection, the two or more media content lists associated with the specific media content user are compared to determine if different versions exist. As such, at Decision 806, a determination is made as to whether any media content entry timestamps in the two or more media content lists differ. If a determination is made that none of the media content entry timestamps differ in any of the two or more media content lists, at Event 808, the lists are determined to be equivalent and the process ends.

If a determination is made that one or more media content entry timestamps differ in any two of the media content lists then, at Decision 810, a determination is to whether there are media content additions in any of the media content lists. If there are any media content additions in any of the media content lists then, at Event 812, all of the media content addition entries are added to the unified version of the media content list and the process proceeds to Decision 814.

If a determination is made that no media content additions have been made to any of the media content lists or after completion of adding the additions to the unified version of the media content list then, at Decision 814, a determination is made to whether there are identical deletion entries in all of the media content lists. If there are consistent deletion entries included in all of the media content lists then, at Event 816, the corresponding entry is deleted from the unified version of the media content list.

If a determination is made that no identical media content deletions have been made to any entry in all of the media content lists or after completion of deleting the entries from the unified version of the media content list then, at Decision 818, a determination is made to whether there are any deletion entries in less than all of media content lists. If there are deletion entries affecting one or more media content list, but not all of the media content lists then, at Event 820, the corresponding entry in the unified media content list is identified or otherwise marked as a possible deletion.

If a determination is made that no deletions have been made to any entry in less than all of the media content lists or after completion of identifying entries as possible deletions in the unified version of the media content list then, at Event 822, the entries are ordered in the unified version according to the position associated with the latest timestamp. At Decision 824, a determination is made as to whether any conflicting positions exist in the order of the unified version of the media content list. If conflicting positions are determined to exist, at Event 826, the conflicting positions are ordered with the latest timestamp occurring first.

If a determination is made that no conflicting positions exist or after ordering the conflicting positions then, at decision 827, a determination is made as whether additional versions of the list currently exist. If additional versions of the list currently exist the process returns to Event 804, for a comparison of the media content lists. If timestamps are determined to differ the process will proceed with the necessary merging of the additional lists. If more than two versions of the latest exist, the process will merge the versions pair-wise, initially merging the two versions including the earliest-in-time timestamps, followed by the next version including the next earliest-in-time timestamp and so on.

If a determination is made that no additional versions of the list currently exist then, at decision 828, a determination is made as to whether any entries were previously identified as possible deletions. If entries were previously identified as possible deletions then, at Event 830, the possible deletion entries are moved to the end of the unified version of the media content list.

If a determination is made that no entries were previously identified as possible deletions or after moving the possible deletion entries to the end of the unified version of the media content list, at Event 832, the unified version of the media content list is deemed complete or otherwise finished and is communicated/stored as appropriate.

Figure 25:
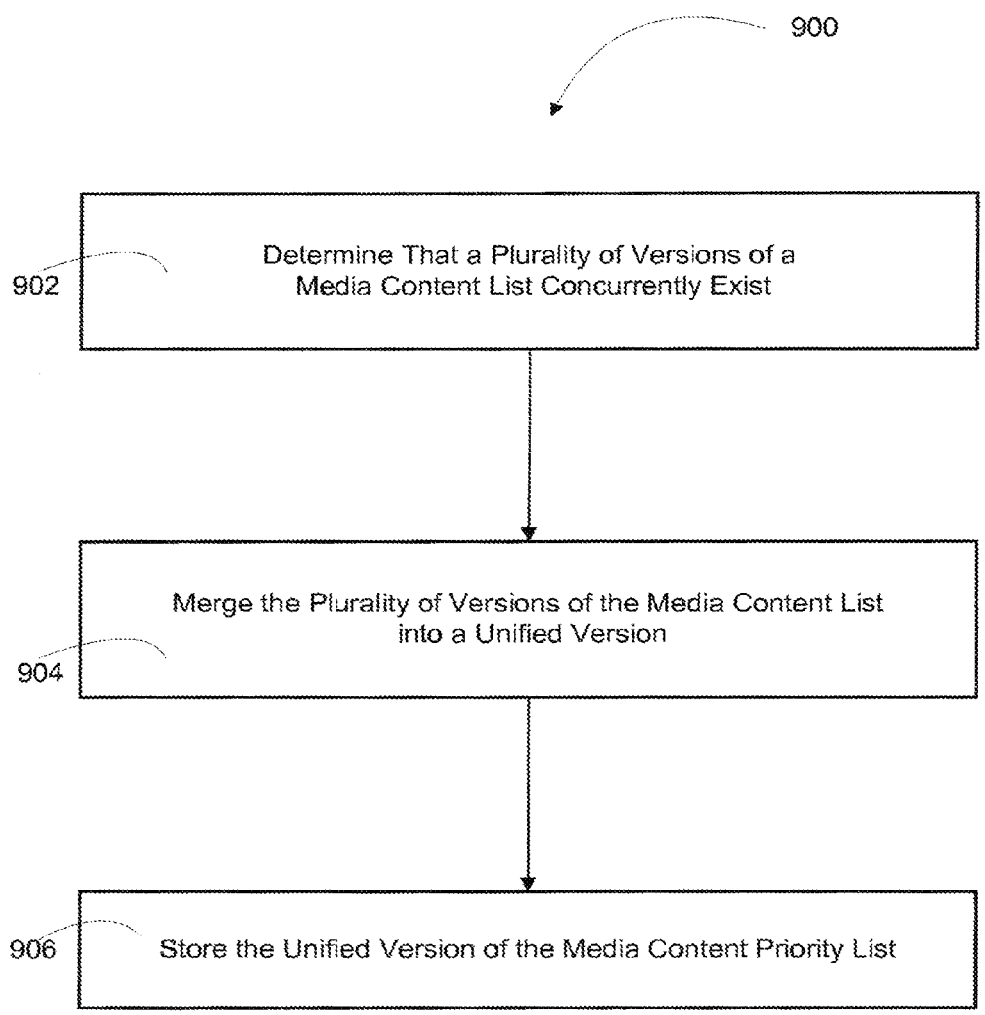
FIG. 25 is a flow diagram of a method for reconciling different versions of media content lists concurrently existing in a communication network, according to yet another aspect.

Turning the reader's attention to FIG. 25, a flow diagram is depicted of another method 900 for reconciling different versions of a media content list concurrently existing in a communications network, according to a yet another aspect. At Event 902, a determination is made that a plurality of versions of a media content list associated with a specific media content user concurrently exist in the communication network. The determination may be made, each time a network connection is made, by comparing an overall timestamp associated with the media content lists that reflects the time of the latest update to that list or comparing the timestamps associated with each entry in the media content lists to determine if any entries differ. Determining that a plurality of versions exists may further include determining that more than two versions of the media content list concurrently exist. In such aspects, the merging of the more than two versions may occur pairwise, the first pair of versions that are merged being the two versions that are earliest in time followed by the merging of the result of the first pair of versions with the next-in-time version and so on until all concurrently existing versions have been merged into a unified version.

At Event 904, the plurality of versions of the media content list are merged into a unified version according to one or more merge rules. The merge rules may include, but are not limited to, adding all media content addition entries from the plurality of versions to the unified version, deleting a media content from the unified version, if all of the plurality of concurrently existing versions include a deletion for a specific media content entry, identifying a media content entry as a possible deletion, if less than all of the plurality of concurrently existing versions include a deletion for a specific media content entry, moving the identified possible deletion entries to the end of the merged list and ordering the unified version of the media content list based on a latest timestamp in the versions being merged, such that conflicting positions in the order are ordered with the latest timestamp appearing first in the list of the unified version.

At Event 906, the merged unified version of the media content list is stored. Storing the unified version of the media content list may further include storing the unified version of the media content list at one or more user-controlled communication device, such as a media content player device or the like and at one or more network apparatus, such as a network server and/or a network kiosk. As such, the method may further include communicating the unified version of the media content list to at least one of a user-controlled communication device, such as a media content player device or a network apparatus.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, aspects are provided for reconciling different versions of media content lists that concurrently exist in a communication network. Aspects herein disclosed merge media content lists based on foreseen user expectations, taking into account typical user behavior. In one particular aspect the merge of media content lists includes the merge of media content acquisition priority lists that are maintained and routinely updated by the associated media content user.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method utilizing at least one computing device for reconciling concurrently existing versions of a media content list, comprising:
   determining that a plurality of versions of the media content list concurrently exist, wherein the plurality of versions comprises two or more versions;
   merging the plurality of versions of the media content list into a unified version, wherein the unified version is configured to incorporate all additions to any of the plurality of versions of the media content list that are merged into the unified version;
   storing the unified version of the media content list, wherein
      the media content list is further defined as a media content priority list, the media content priority list defines a priority listing of media content that a user associated with the media content list desires to acquire,
      the media content list is further defined as a media content acquisition priority list, the media content acquisition priority list delivers media content in accordance with a priority for acquiring media content as being ordered in the list, and
      the determining that the plurality of versions of the media content list concurrently exist further comprises comparing separate media content lists stored at two or more devices each time the two or more devices establish a network connection with each other; and
   comparing timestamps associated with each entry in the separate media content lists, wherein the plurality of versions of the media content list is determined to exist if one or more timestamps differ amongst entries in the separate media content lists, wherein
      the merging further comprises ordering entries in the unified version of the media content priority list based on a latest timestamp in the plurality of versions being merged; and
      the determining that the plurality of versions of the media content list concurrently exist further comprises comparing a timestamp associated with each of media content priority lists of the plurality of versions of the media content list to determine if the timestamps differ between the media content priority lists to determine which version takes precedence, and
   if the comparison indicates that there are conflicting timestamps resulting from at least changes made during network disconnection on a mobile device of the two or more devices to a respective version of the plurality of versions of the media content priority list on the mobile device, precedence is given to the latest time stamped entry appearing first in the unified list, the latest time stamped entry replacing any other conflicting entries in the respective version.

2. The method of claim 1, wherein the merging further comprises merging pairwise the two or more versions of the media content list.

3. The method of claim 2, wherein the merging pairwise further comprises merging pairs of versions sequentially based on a time associated with when a version is created.

4. The method of claim 1, wherein the merging the plurality of versions of the media content list further comprises adding all media content addition entries from the plurality of versions of the media content list in the unified version of the media content list.

5. The method of claim 1, wherein the merging the plurality of versions of the media content list further comprises deleting a media content entry from the unified version of the media content list, if all of the plurality of versions of the media content list include a deletion for the media content entry.

6. The method of claim 1, wherein the merging the plurality of versions of the media content list further comprises identifying as a possible deletion a media content entry in the unified version of the media content list, if less than all of the plurality of versions of the media content list include a deletion for the media content entry.

7. The method of claim 6, wherein the merging further comprises moving all media content entries identified as a possible deletion to end of list in the unified version after completion of all additions, deletions and order changes to the list in the unified version.

8. The method of claim 1, wherein the storing the unified version of the media content list further comprises storing the unified version of the media content list at one or more communications devices and at one or more network devices.

9. The method of claim 1, further comprising communicating the unified version of the media content list to at least one of a communications device or a network device.

10. At least one hardware processor configured to reconcile concurrently existing versions of a media content list, comprising:
   a first module for determining that a plurality of versions of the media content list concurrently exist, wherein the plurality of versions comprises two or more versions;
   a second module for merging the plurality of versions of the media content list into a unified version, wherein the unified version is configured to incorporate all additions to any of the plurality of versions of the media content list that are merged into the unified version;
   a third module for storing the unified version of the media content list, wherein
      the media content list is further defined as a media content priority list, the media content priority list defines a priority listing of media content that a user associate with the media content list desires to acquire,
      the media content list is further defined as a media content acquisition priority list, the media content acquisition priority list delivers media content in accordance with a priority for acquiring media content as being ordered in the list, and
      the determining that the plurality of versions of the media content list concurrently exist further comprises comparing separate media content lists stored at two or more devices each time the two or more devices establish a network connection with each other; and
   a fourth module for comparing timestamps associated with each entry in the separate media content lists, wherein the plurality of versions of the media content list is determined to exist if one or more timestamps differ amongst entries in the separate media content lists, wherein the merging further comprises ordering entries in the unified version of the media content priority list based on a latest timestamp in the plurality of versions being merged; and the determining that the plurality of versions of the media content list concurrently exist further comprises comparing a timestamp associated with each of media content priority lists of the plurality of versions of the media content list to determine if the timestamps differ between the media content priority lists to determine which version takes precedence, if the comparison indicates that there are conflicting timestamps resulting from at least changes made during network disconnection on a mobile device of the two or more devices to a respective version of the plurality of versions of the media content priority list on the mobile device, precedence is given to the latest time stamped entry appearing first in the unified list, the latest time stamped entry replacing any other conflicting entries in the respective version.

11. A non-transitory computer readable medium having stored thereon computer-executable instructions for reconciling concurrently existing versions of a media content list to determine which version takes precedence comprising:

first set of codes, executed by a computer, for determining that a plurality of versions of the media content list concurrently exist, wherein the plurality of versions comprises two or more versions;

a second set of codes, executed by the computer, for merging the plurality of versions of the media content list into a unified version, wherein the unified version is configured to incorporate all additions to any of the plurality of versions of the media content list that are merged into the unified version;

a third set of codes, executed by the computer, for storing the unified version of the media content list, wherein the media content list is further defined as a media content priority list, the media content priority list defines a priority listing of media content that a user associate with the media content list desires to acquire, the media content list is further defined as a media content acquisition priority list, the media content acquisition priority list delivers media content in accordance with a priority for acquiring media content as being ordered in the list, and the determining that the plurality of versions of the media content list concurrently exist further comprises comparing separate media content lists stored at two or more devices each time the two or more devices establish a network connection with each other; and a fourth set of codes, executed by the computer, for comparing timestamps associated with each entry in the separate media content lists, wherein the plurality of versions of the media content list is determined to exist if one or more timestamps differ amongst entries in the separate media content lists, wherein the merging further comprises ordering entries in the unified version of the media content priority list based on a latest timestamp in the plurality of versions being merged; and the determining that the plurality of versions of the media content list concurrently exist further comprises comparing a timestamp associated with each of media content priority lists of the plurality of versions of the media content list to determine if the timestamps differ between the media content priority lists to determine which version takes precedence, if the comparison indicates that there are conflicting timestamps resulting from at least changes made during network disconnection on a mobile device of the two or more devices to a respective version of the plurality of versions of the media content priority list on the mobile device, precedence is given to the latest time stamped entry appearing first in the unified list, the latest time stamped entry replacing any other conflicting entries in the respective version.

12. An apparatus for reconciling concurrently existing versions of a media content list, comprising:

means for determining that a plurality of versions of the media content list concurrently exist, wherein the plurality of versions comprises two or more versions;

means for merging the plurality of versions of the media content list into a unified version, wherein the unified version is configured to incorporate all additions to any of the plurality of versions of the media content list that are merged into the unified version;

means for storing the unified version of the media content list, wherein the media content list is further defined as a media content priority list, the media content priority list defines a priority listing of media content that a user associate with the media content list desires to acquire, the media content list is further defined as a media content acquisition priority list, the media content acquisition priority list delivers media content in accordance with a priority for acquiring media content as being ordered in the list, and the determining that the plurality of versions of the media content list concurrently exist further comprises comparing separate media content lists stored at two or more devices each time the two or more devices establish a network connection with each other; and means for comparing timestamps associated with each entry in the separate media content lists, wherein the plurality of versions of the media content list is determined to exist if one or more timestamps differ amongst entries in the separate media content lists, wherein the merging further comprises ordering entries in the unified version of the media content priority list based on a latest timestamp in the plurality of versions being merged; and the determining that the plurality of versions of the media content list concurrently exist further comprises comparing a timestamp associated with each of media content priority lists of the plurality of versions of the media content list to determine if the timestamps differ between the media content priority lists to determine which version takes precedence, if the comparison indicates that there are conflicting timestamps resulting from at least changes made during network disconnection on a mobile device of the two or more devices to a respective version of the plurality of versions of the media content priority list on the mobile device, precedence is given to the latest time stamped entry appearing first in the unified list, the latest time stamped entry replacing any other conflicting entries in the respective version.

13. A communications device for reconciling concurrently existing versions of a media content list, comprising:
- a computer platform including a hardware processor and a hardware memory in communication with the hardware processor;
- a media content list module stored in the memory and in communication with the processor, wherein the media content list module is configured to provide for a user configurable media content list;
- a media content list merge module stored in the memory and in communication with the processor, wherein the media content list merge module is configured to
  - determine that a plurality of versions of a media content list concurrently exist, the plurality of versions comprises two or more versions,
  - merge the versions of the media content list into a unified version, and
  - store the unified version of the media content list, wherein the unified version is configured to incorporate all additions to any of the plurality of versions of the media content list that are merged into the unified version;
- a media content player module stored in the memory and in communication with the processor, wherein the media content player module is configured to play selected media content in the unified version of the media content list on the device; wherein
  - the media content list module is further configured to provide for a user configurable media content priority list, the media content priority list defines a priority listing of media content that the user desires to acquire;
  - the media content list module is further configured to provide for the user configurable media content acquisition priority list, the media content acquisition priority list delivers media content in accordance with a priority for acquiring media content as being ordered in the list; and
  - the media content list module is further configured to create an entry timestamp each time an entry in the media content list is edited, and
  - the media content list merge module is further configured to order entries in the unified version based on a latest timestamp in each of the versions being merged to determine which version takes precedence,
  - if the comparison indicates that there are conflicting timestamps resulting from at least changes made during network disconnection on a mobile device to a respective version of the media content list of the plurality of versions of the media content priority list on the mobile device, precedence is given to the latest time stamped entry appearing first in the unified list, the latest time stamped entry replacing any other conflicting entries in the respective version.

14. The device of claim 13, wherein the media content list module is further configured to create a list timestamp each time the media content list is edited.

15. The device of claim 13, wherein the media content list merge module is further configured to compare a device-stored media content list with a network-stored media content list each time the device establishes a network connection with a media content service.

16. The device of claim 15, wherein the media content list merge module is further configured to create a current timestamp prior to communicating the device-stored media content list to a network apparatus for comparison of the network-stored media content list, wherein the current timestamp is used by the network apparatus to correct any errors in list or entry timestamps.

17. The device of claim 13, wherein the media content list merge module is further configured to compare a timestamp associated with each entry in existing media content lists, wherein a plurality of versions of the media content list is determined to exist if one or more timestamps differ amongst entries in the existing media content lists.

18. The device of claim 13, wherein the media content list merge module is further configured to compare timestamps associated with the media content lists, wherein a plurality of versions of the media content list is determined to exist if the timestamps differ.

19. The device of claim 13, wherein the media content list merge module is further configured to merge pairwise the more than two versions of the media content list.

20. The device of claim 19, wherein the media content list merge module is further configured to merge pairs of versions sequentially based on a time associated with when a version is created.

21. The device of claim 13, wherein the media content list merge module is further configured to add all media content addition entries from the plurality of versions of the media content list in the unified version of the media content list.

22. The device of claim 13, wherein the media content list merge module is further configured to delete a media content entry from the unified version of the media content priority list, if all of the plurality of versions of the media content list include a deletion for the media content entry.

23. The device of claim 13, wherein the media content list merge module is further configured to identify as a possible deletion a media content entry in the unified version of the media content list, if less than all of the plurality of versions of the media content list include a deletion for the media content entry.

24. The device of claim 23, wherein the media content list merge module is further configured to move all media content entries identified as a possible deletion to end of list in the unified version after completion of all additions, deletions and order changes to the list in the unified version.

25. The device of claim 13, further comprising a communications module in communication with the processor and the media content list merge module, wherein the communications module is configured to communicate the unified version to a network device.

26. A network apparatus for reconciling concurrently existing versions of a media content list, comprising:
- a computer platform including a hardware processor and a hardware memory in communication with the processor;
- a media content list database stored in the memory and in communication with the processor, wherein the media content list module is operable to store media content lists, each list associated with an associated media content user;
- a media content list merge module stored in the memory and in communication with the processor, wherein the media content list merge database is configured to determine that a plurality of versions of a media content list concurrently exist for the associated media content user and merge the plurality of versions of the media content list into a unified version, wherein
  - the plurality of versions comprises two or more versions;
  - the unified version is configured to incorporate all additions to any of the plurality of versions of the media content list that are merged into the unified version;

the network apparatus is further defined as at least one of one or more kiosks geographically distributed in a content delivery service system or one or more network servers associated with the content delivery service system;

the media content list database is further configured to store media content acquisition priority lists and media content priority list, wherein each media content acquisition priority list associated with a corresponding media content user, each media content acquisition priority list delivers media content in accordance with a priority for acquiring media content as being ordered in the list; and each media content priority list defines a priority listing of media content that the content media user desires to acquire;

the media content list database is further configured to store the unified version of the media content list as the corresponding user's current media content list;

the media content list merge module is further configured to compare the media content list in the database associated with the media content user each time a network connection is made to a communications device associated with the media content user;

the media content list merge module is further configured to compare a timestamp associated with each entry in existing media content lists associated with the media content user, a plurality of versions is determined to exist if one or more timestamps differ amongst entries in the existing media content lists, and the media content list merge module is further configured to order entries in the unfiled version of the media content list based on a latest timestamp in the plurality of versions being merged to determine which version takes precedence, wherein if the comparison indicates that there are conflicting timestamps resulting from at least changes made during network disconnection on a mobile device to a respective version of the media content list of the plurality of versions of the media content priority list on the mobile device, precedence is given to the latest time stamped entry appearing first in the unified list, the latest time stamped entry replacing any other conflicting entries in the respective version.

27. The network apparatus of claim 26, wherein the media content list merge module is further configured to merge pairwise the more than two versions of the media content list.

28. The network apparatus of claim 27, wherein the media content list merge module is further configured to merge pairs of versions sequentially based on a time associated with when a version is created.

29. The network apparatus of claim 26, wherein the media content list merge module is further configured to add all media content addition entries from the plurality of versions of the media content list associated with the media content user into the unified version of the media content list.

30. The network apparatus of claim 26, wherein the media content list merge module is further configured to delete a media content entry from the unified version of the media content list, if all of the plurality of versions of the media content list associated with the media content user include a deletion for the media content entry.

31. The network apparatus of claim 26, wherein the media content list merge module is further configured to identify as a possible deletion a media content entry in the unified version of the media content list, if less than all of the plurality of versions of the media content list associated with the media content user include a deletion for the media content entry.

32. The network apparatus of claim 31, wherein the media content list merge module is further configured to move all media content entries identified as a possible deletion to end of list in the unified version after completion of all additions, deletions and order changes to the list in the unified version.

33. The network apparatus of claim 26, further comprising a communications module in communication with the processor and the media content list merge module, wherein the communications module is configured to receive the unified version of the media content list from the media content list merge module and communicate the unified version of the media content list to one or more communications devices associated with the media content user.

* * * * *